(12) United States Patent
Jong et al.

(10) Patent No.: US 10,628,007 B2
(45) Date of Patent: *Apr. 21, 2020

(54) PAGE OPERATING METHOD AND ELECTRONIC DEVICE THEREOF

(71) Applicant: Samsung Electronics Co., Ltd., Gyeonggi-do (KR)

(72) Inventors: In-Won Jong, Seoul (KR); Chang-Mo Yang, Gyeonggi-do (KR); Yun Jegal, Seoul (KR)

(73) Assignee: Samsung Electronics Co., Ltd (KR)

( * ) Notice: Subject to any disclaimer, the term of this patent is extended or adjusted under 35 U.S.C. 154(b) by 45 days.

This patent is subject to a terminal disclaimer.

(21) Appl. No.: 15/671,858

(22) Filed: Aug. 8, 2017

(65) Prior Publication Data

US 2017/0336946 A1 Nov. 23, 2017

Related U.S. Application Data

(63) Continuation of application No. 14/196,504, filed on Mar. 4, 2014, now Pat. No. 9,785,319.

(30) Foreign Application Priority Data

Mar. 4, 2013 (KR) .................. 10-2013-0023031

(51) Int. Cl.
*G06F 3/048* (2013.01)
*G06F 3/0484* (2013.01)
(Continued)

(52) U.S. Cl.
CPC ........ *G06F 3/04842* (2013.01); *G06F 3/0483* (2013.01); *G06F 3/0485* (2013.01);
(Continued)

(58) Field of Classification Search
CPC ............ G06F 3/04842; G06F 3/04883; G06F 3/0483; G06F 3/0488; G06F 3/0486;
(Continued)

(56) References Cited

U.S. PATENT DOCUMENTS

| 5,530,865 A | 6/1996 | Owens |
|---|---|---|
| 7,509,588 B2 | 3/2009 | Van Os et al. |

(Continued)

FOREIGN PATENT DOCUMENTS

| CN | 101957718 | 1/2011 |
|---|---|---|
| CN | 102236516 | 11/2011 |

(Continued)

OTHER PUBLICATIONS

David Pogue: "iPhone: The Missing Manual Fourth Edition", XP055042248, Aug. 24, 2010, 56 pages.

(Continued)

*Primary Examiner* — Jeanette J Parker
(74) *Attorney, Agent, or Firm* — The Farrell Law Firm, P.C.

(57) ABSTRACT

An electronic device and method for operating a page displayed on the electronic device is provided. An object is displayed on a first page. In response to detecting a touch input on the object, the object is displayed in a floating state, a first indicator of a first page is changed to a first thumbnail image and a second indicator of a second page is changed to a second thumbnail image. In response to detecting a drag input on the object, the object is displayed in a second area of the first page, and the first thumbnail image is changed by moving the object to the second area. In response to detecting another drag input, the object is displayed in the second page, and the first and second thumbnail images are changed by moving the object to the second.

10 Claims, 31 Drawing Sheets

(51) Int. Cl.
    *G06F 3/0485* (2013.01)
    *G06F 3/0486* (2013.01)
    *G06F 3/0488* (2013.01)
    *G06F 3/0483* (2013.01)

(52) U.S. Cl.
    CPC .......... *G06F 3/0486* (2013.01); *G06F 3/0488* (2013.01); *G06F 3/04883* (2013.01)

(58) Field of Classification Search
    CPC .... G06F 3/0485; G06F 3/0416; G06F 3/0412; G06F 3/048
    See application file for complete search history.

(56) References Cited

U.S. PATENT DOCUMENTS

| | | |
|---|---|---|
| 9,146,634 B2 | 9/2015 | Yang et al. |
| 9,857,940 B2 | 1/2018 | Park |
| 2010/0218137 A1 | 8/2010 | Sim et al. |
| 2010/0295789 A1 | 11/2010 | Shin et al. |
| 2011/0061010 A1 | 3/2011 | Wasko |
| 2012/0079432 A1 | 3/2012 | Lee et al. |
| 2012/0084692 A1 | 4/2012 | Bae |
| 2012/0188275 A1 | 7/2012 | Shimazu |
| 2013/0050119 A1 | 2/2013 | Nemoto |
| 2013/0222283 A1 | 8/2013 | Yun |
| 2013/0249841 A1 | 9/2013 | Yang et al. |
| 2014/0013254 A1 | 1/2014 | Hosein |
| 2015/0378707 A1* | 12/2015 | Park ...................... G06F 3/0486 717/174 |

FOREIGN PATENT DOCUMENTS

| | | |
|---|---|---|
| CN | 102693087 | 9/2012 |
| CN | 102880396 | 1/2013 |
| JP | 2009-265976 | 11/2009 |
| KR | 1020100093909 | 8/2010 |
| KR | 1020120031357 | 4/2012 |

OTHER PUBLICATIONS

European Search Report dated Oct. 20, 2017 issued in counterpart application No. 14157495.4-1507, 8 pages.
European Search Report dated Nov. 12, 2018 issued in counterpart application No. 14157495.4-1231, 6 pages.
Chinese Office Action dated Sep. 28, 2016 issued in counterpart application No. 20140076323.9, 17 pages.
Chinese Office Action dated Jun. 15, 2017 issued in counterpart application No. 201410076323.9, 12 pages.
Korean Office Action dated Sep. 23, 2019 issued in counterpart application No. 10-2013-0023031, 17 pages.
Korean Office Action dated Mar. 3, 2020 issued in counterpart application No. 10-2013-0023031, 7 pages.

* cited by examiner

PAGE OPERATING METHOD AND ELECTRONIC DEVICE THEREOF

PRIORITY

This application is a Continuation application of U.S. patent application Ser. No. 14/196,504 filed in the U.S. Patent and Trademark Office on Mar. 4, 2014, which claims priority under 35 U.S.C. § 119(a) to a Korean Patent Application filed in the Korean Intellectual Property Office on Mar. 4, 2013 and assigned Serial No. 10-2013-0023031, the contents of which are incorporated herein by reference.

BACKGROUND OF THE INVENTION

1. Field of the Invention

The present invention relates generally to an electronic device, and more particularly, to a page operating method and an electronic device thereof.

2. Description of the Related Art

The development of multimedia technologies has resulted in the advent of electronic devices having various functions. Commonly, the electronic devices have a convergence function of complexly performing one or more functions.

Presently, a touch screen device consisting of a display module and a touch sensing means are the most commonly used electronic devices. The touch screen device is rapidly developing to express diversified data more efficiently and user-intuitively.

For example, data such as application icons, folder icons, widget icons, and document icons are being displayed at predetermined intervals on the touch screen device. When these icons can no longer be displayed on a corresponding page or according to a user's preference, the touch screen device creates several pages and moves or creates corresponding icons on a corresponding page.

Accordingly, a page operating method which is more intuitive and convenient for use would be beneficial to increase of the number of objects displayed in the touch screen device and an array, arrangement, design, etc. according to the user's preference.

SUMMARY OF THE INVENTION

Aspects of the present invention are provided to address at least the above problems and/or disadvantages and to provide at least the advantages described below. Accordingly, an aspect of the present invention is to provide an improved page operating method that is intuitive and an electronic device thereof.

According to an aspect of the present invention, an electronic device is provided that includes a memory storing instructions, a display, and one or more processors, operably coupled to the memory and the display. The one or more processors are configured to execute the stored instructions to display, in a first page among a plurality of pages including a second page, at least one object in an executable state and display, outside of the first page, a first indicator indicating the first page and a second indicator indicating the second page. In response to detecting a touch input on the at least one object in the executable state, the one or more processor are configured to display, in the first page with a reduced size, the at least one object in a floating state changed from the executable state, and display, outside of the first page with the reduced size, a first thumbnail image changed from the first indicator and a second thumbnail image changed from the second indicator. The first thumbnail image represents the first page and the second thumbnail image represents the second page. In response to detecting a drag input for moving the at least one object in the floating state from a first area of the first page with the reduced size to a second area of the first page with the reduced size, the one or more processor are configured to display, in the second area of the first page with the reduced size, the at least one object in the floating state, and display, outside of the first page with the reduced size, the first thumbnail image representing the first page with the reduced size changed by moving the at least one object to the second area. In response to detecting another drag input for moving the at least one object in the floating state to the second thumbnail image, the one or more processors are configured to display, in the second page with a reduced size changed from the first page with the reduced size, the at least one object in the floating state, and display, outside of the second page with the reduced size, the first thumbnail image representing the first page with the reduced size changed by moving the at least one object to the second page with the reduced size and the second thumbnail image representing the second page with the reduced size changed by moving the at least one object to the second page with the reduced size.

According to another aspect of the present invention, an electronic device is provided that includes a memory storing instructions, a display unit, and a processor, operably coupled to the memory and the display unit. The processor is configured to execute the stored instructions to receive a user input to edit at least one object displayed in the display unit. In response to receiving the user input, the processor is configured to display a first page, which includes at least one object, and a plurality of thumbnail images. The plurality of thumbnail images includes a first thumbnail image corresponding to the first page and a second thumbnail image corresponding to a second page that is not currently displayed. The processor is also configured to detect a drag input on the at least one object. If the drag input is directed toward a first area of the first page, the processor is configured to display the at least one object in the first area and change a representation of the first thumbnail image to correspond to the at least one object displayed in the first area. If the drag input is directed toward a second area corresponding to the second thumbnail image, the processor is configured to move the at least one object to the second page from the first page, change the representation of the first thumbnail image to correspond to moving the at least one object to the second page, and change a representation of the second thumbnail image to correspond to moving the at least one object to the second page.

According to another aspect of the present invention, a computer program product having a non-transitory computer readable storage medium with a computer readable program stored therein is provided. The computer readable program, when executed on at least one processor, configures, the at least one processor to display, in a first page among a plurality of pages including a second page, at least one object in an executable state and display, outside of the first page, a first indicator indicating the first page and a second indicator indicating the second page. In response to detecting a touch input on the at least one object in the executable state, the at least one processor displays, in the first page with a reduced size, the at least one object in a floating state changed from the executable state, and displays, outside of the first page with the reduced size, a first thumbnail image changed from the first indicator and a second thumbnail image changed from the second indicator. The first thumbnail image represents the first page and the second thumbnail image represents the second page. In response to detecting a drag input for moving the at least one object in the floating state from a first area of the first page with the reduced size to a second area of the first page with the reduced size, the at least one processor displays, in the second area of the first page with the reduced size, the at least one object in the floating state, and displays, outside of the first page with the reduced size, the first thumbnail image representing the first page with the reduced size changed by moving the at least one object to the second area. In response to detecting another drag input for moving the at least one object in the floating state to the second thumbnail image, the at least one processor displays, in the second page with a reduced size changed from the first page with the reduced size, the at least one object in the floating state, and displays, outside of the second page with the reduced size, the first thumbnail image representing the first page with the reduced size changed by moving the at least one object to the second page with the reduced size and the second thumbnail image representing the second page with the reduced size changed by moving the at least one object to the second page with the reduced size.

According to another aspect of the present invention, a computer program product having a non-transitory computer readable storage medium with a computer readable program stored therein is provided. The computer readable program, when executed on at least one processor, configures, the at least one processor to receive a user input to edit at least one object displayed in the display unit. In response to receiving the user input, the at least one processor displays a first page, which includes at least one object, and a plurality of thumbnail images. The plurality of thumbnail images includes a first thumbnail image corresponding to the first page and a second thumbnail image corresponding to a second page that is not currently displayed. The at least one processor also detects a drag input on the at least one object. If the drag input is directed toward a first area of the first page, the at least one processor displays the at least one object in the first area and change a representation of the first thumbnail image to correspond to the at least one object displayed in the first area. If the drag input is directed toward a second area corresponding to the second thumbnail image, the at least one processor moves the at least one object to the second page from the first page, changes the representation of the first thumbnail image to correspond to moving the at least one object to the second page, and changes a representation of the second thumbnail image to correspond to moving the at least one object to the second page.

BRIEF DESCRIPTION OF THE DRAWINGS

The above and other objects, features, and advantages of embodiments of the present invention will become more apparent from the following detailed description when taken in conjunction with the accompanying drawings in which.

DETAILED DESCRIPTION OF EMBODIMENTS OF THE PRESENT INVENTION

Embodiments of the present invention will be described herein with reference to the accompanying drawings. In the following description, well-known functions or constructions are not described in detail since they would obscure the invention in unnecessary detail. The terms described below, which are defined considering functions of an embodiment of the present invention, can be varied according to a user, an operator's intention or practice and the like. Therefore, terms should be defined based on the context of this description. Also, the drawings use the same symbols for the same constituent elements.

In the following description, an electronic device is assumed to include a touch screen (device) which is able to perform, on a screen, an input process through an input device and a display process through a display unit. Accordingly, in a construction of the electronic device according to the embodiments of the present invention, although the display unit and the input device are illustrated separately, the display unit may include the input device or the input device may be provided as the display unit. Further, it should be noted that the display unit can be embodied as the touch screen (device) in the embodiments of the present invention.

Further, the embodiments of the present invention are not limited only to the electronic device with the touch screen and can be applied to various electronic devices. For example, the embodiments of the present invention may be applied to an electronic device in which the display unit and the input device are physically separated.

In the following description, an electronic device including a touch screen as a display unit is shown and described. However, this structure is not intended to limit the scope and spirit of the present invention. For example, the electronic device can include various devices with touch screens, such as a Personal Digital Assistant (PDA), a laptop computer, a mobile phone, a smart phone, a netbook, a Mobile Internet Device (MID), an Ultra Mobile Personal Computer (UMPC), a tablet PC, a navigator, an MPEG Audio Layer-3 (MP3) player and the like.

Figure 1:
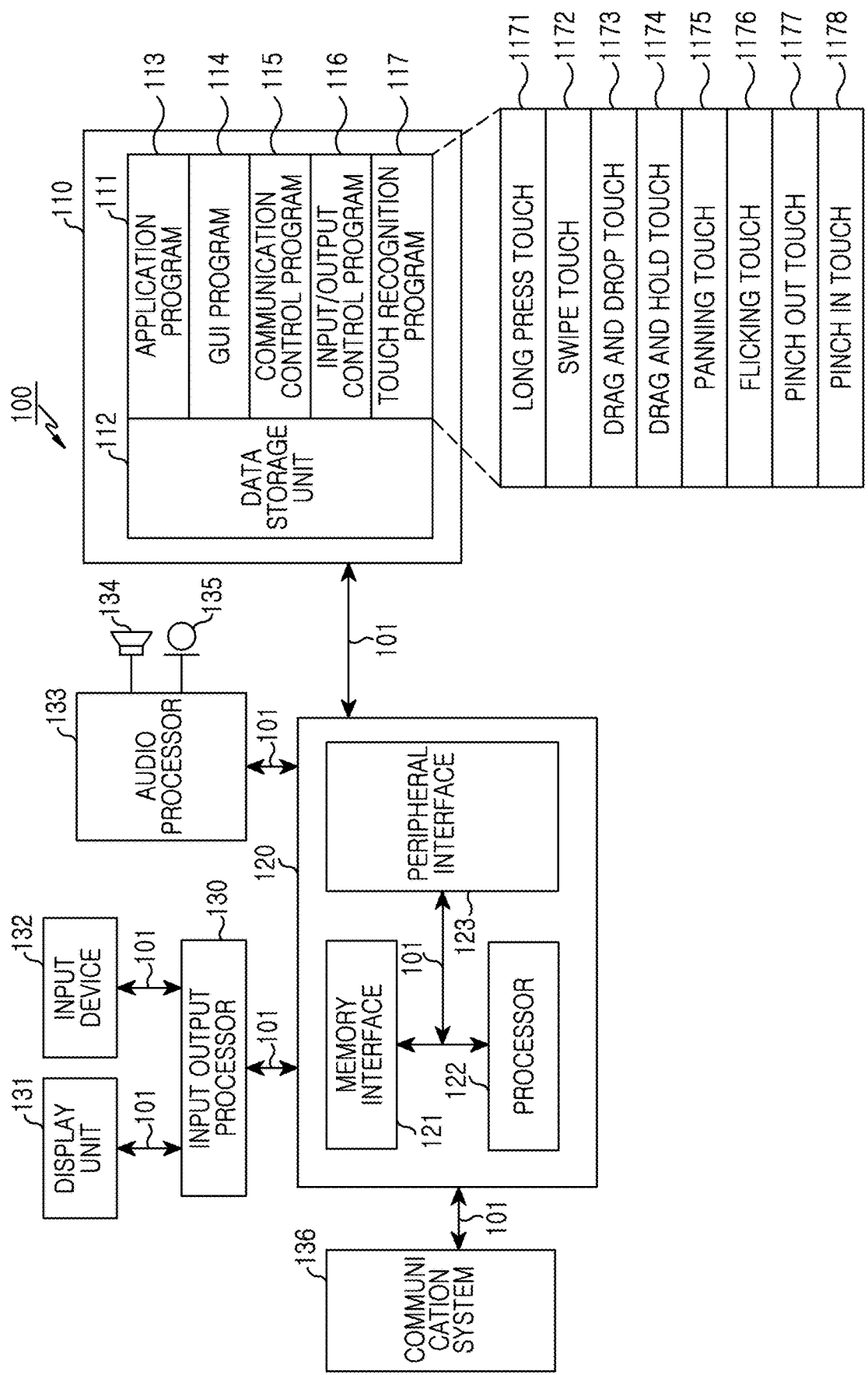
FIG. 1 is a block diagram illustrating an electronic device according to an embodiment of the present invention.

FIG. 1 is a block diagram illustrating an electronic device 100 according to an embodiment of the present invention.

Referring to FIG. 1, the electronic device 100 includes a memory 110, a processing unit 120, an input output processor 130, a display unit 131, an input device 132, an audio processor 133, and a communication system 136. The constituent elements can communicate with one another through one or more communication buses or signal lines 101.

The memory 110 includes a program storage unit 111 storing a program for controlling an operation of the electronic device 100, and a data storage unit 112 storing data generated during program execution. The memory 110 stores data and other pieces of information, which are generated in the program during an operation of a processor 122.

For example, the data storage unit 112 can store database information that the processor 122 uses in a process of determining running related programs through a touch recognition program 117. Additionally, the data storage unit 112 can store data such as setting information and other pieces of information necessary for configuring an operation of a graphical user interface in a process of displaying the related programs on the display unit 131.

The program storage unit 111 includes an application program 113, a Graphical User Interface (GUI) program 114, a communication control program 115, an input/output control program 116, and the touch recognition program 117. The programs included in the program storage unit 111 may include a set of instructions and may be expressed as an instruction set.

The application program 113 includes a software element for at least one application program installed in the electronic device 100.

The GUI program 114 includes at least one software element for providing a graphical user interface on the display unit 131. For instance, the GUI program 114 can control a display of information of an application program driven by the processor 122 on the display unit 131.

If it is determined that there is a movement of display information (e.g., a page, objects included on each page, etc.) through the touch recognition program 117, the GUI program 114 can control the movement of the display information displayed on the display unit 131 to a desired position.

The communication control program 115 includes at least one software element for controlling communication with at least one counterpart electronic device using the communication system 136. For example, the communication control program 115 discovers other electronic devices for connecting communication. If the other electronic devices for the communication connection are discovered, the communication control program 115 establishes a connection for communication with the other electronic devices. After that, the communication control program 115 controls to perform a capability discovery and session establishment procedure with the connected other electronic devices and transmits/receives data with the other electronic devices through the communication system 136.

The input/output control program 116 displays an operation of the electronic device 100 on the display unit 131, and receives an input of an operation instruction of the electronic device 100 from a user through the input device 132.

The touch recognition program 117 includes at least one software element for determining a corresponding function according to touch preferences as a function of the nature of a touch or the movement direction thereof. This touch preference includes, for example, a long press touch 1171 holding a long touch state for a predetermined time, a swipe touch 1172 turning a page as if turning a page of book in a touched state, a drag and drop touch 1173 dragging a touch for a predetermined distance in a touched state and releasing the touch, a drag and hold touch 1174 dragging as the touch for a predetermined distance in a touched state and holding the touch for a predetermined time, a panning touch 1175 including a swipe motion while holding a touched state, and the like. In addition, the touch preference can include various other touches such as a flicking touch 1176, a pinch out touch 1177, a pinch in touch 1178, and the like.

For example, if a user inputs a long press touch on a specific object in a page editing state according to an embodiment of the present invention, the touch recognition program 117 may float and display the specific object. The touch recognition program 117 may include a program for performing a corresponding function corresponding to a drag and drop touch or drag and hold touch up to a corresponding position of a touched object.

The memory 110 included in the electronic device 100 can include one or more memory devices. Also, according to a desired functionality, the memory 110 may perform a function of only the program storage unit 111, a function of only the data storage unit 112, or both.

The processor unit 120 includes a memory interface 121, at least one processor 122, and a peripheral interface 123. The memory interface 121, the at least one processor 122, and the peripheral interface 123, which are included in the processor unit 120, can be integrated in at least one circuit or can be realized as separate elements.

The memory interface 121 controls the access of a constituent element such as the processor 122 or the peripheral interface 123 to the memory 110.

The peripheral interface 123 controls the connection of the processor 122 and the memory interface 121 with an input/output peripheral device of the electronic device 100.

The processor 122 controls the electronic device 100 to provide various multimedia and communication services and the like using at least one software program. The processor 122 controls the electronic device 100 to display and check a GUI operation of the electronic device 100 by the display unit 131 through the input output processor 130 and provide an external instruction input, to the input device 132. At this time, the processor 122 controls the electronic device 100 to execute at least one program stored in the memory 110 and provide a service corresponding to the corresponding program.

The audio processor 133 provides an audio interface between a user and the electronic device 100 through a speaker 134 and a microphone 135.

The communication system 136 performs a communication function. For example, the communication system 136 performs communication with other electronic devices using at least any one of a local area wireless communication, such as mobile communication using a base station, Infrared Data Association (IrDA), Bluetooth, Wireless Local Area Network (WLAN) communication, and wired communication.

The input output processor 130 provides an interface between the peripheral interface 123 and an input output device such as the display unit 131, the input device 132 and the like.

The input device 132 provides input data generated, by a user's selection, to the processor unit 120 through the input output processor 130. For example, the input device 132 is constructed to include only a control button for control of the electronic device 100. In another example, the input device 132 may include a keypad for receiving input data from a user.

However, this is not intended to limit the scope of the present invention and, for example, the input device 132 can be included in the display unit 131 and can be provided as a touch screen. In an embodiment of the present invention, the touch screen may be embodied as a touch screen device using a capacitive scheme or a pressure sensitive scheme.

The display unit 131 receives, for example, status information of the electronic device 100, a character which is input by a user, a moving picture, a still picture and the like from the processor unit 120, and displays the received information through the input output processor 130. For example, the processor 122 controls the electronic device 100 to display the status information, the character which is input by the user, the moving picture, the still picture, etc. on the display unit 131 in accordance with setting information corresponding to touch recognition preferences related to a program executable in the electronic device 100.

If the display unit 131 includes a touch screen like the input device 132, a function of the display unit 131 and a function of the input device 132 may all be carried out using one touch screen.

Figure 2:
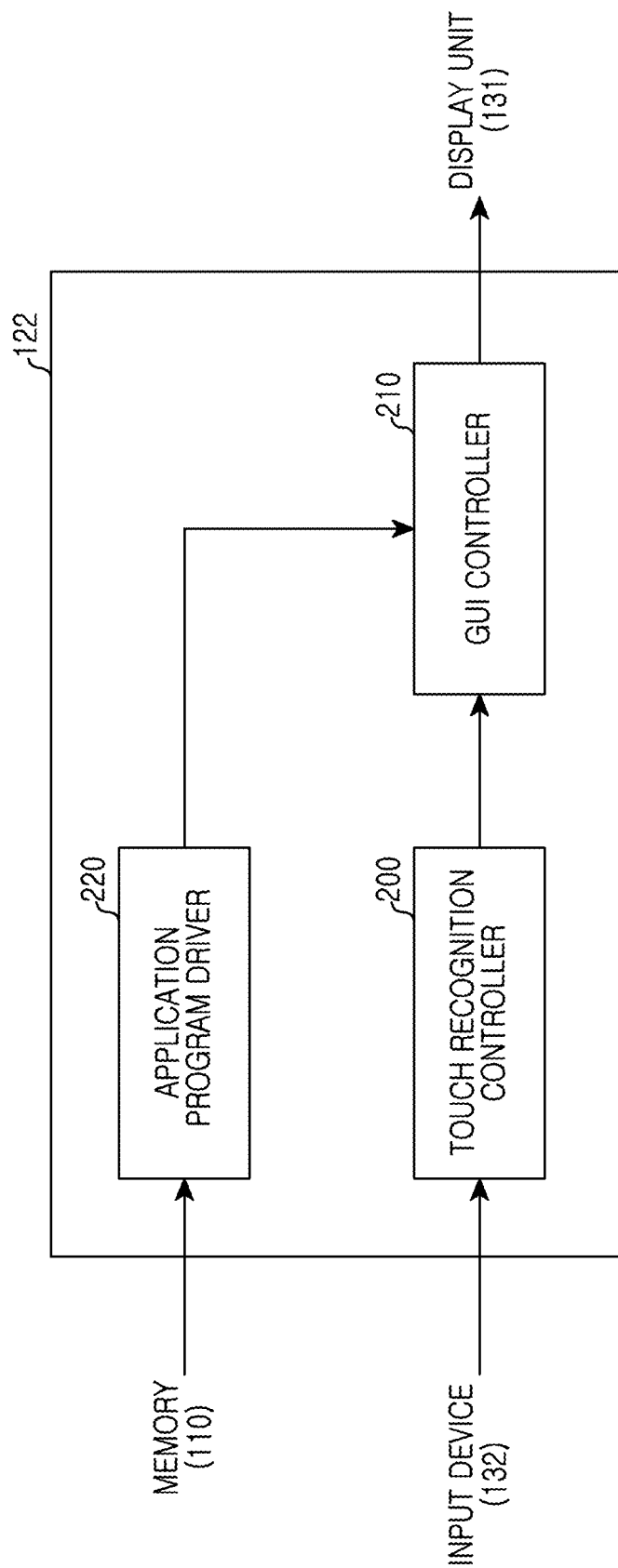
FIG. 2 is a block diagram illustrating a processor according to an embodiment of the present invention.

FIG. 2 is a block diagram illustrating a processor according to an embodiment of the present invention.

Referring to FIG. 2, the processor 122 includes a touch recognition controller 200, a GUI controller 210, and an application program driver 220.

By executing the touch recognition program 117 stored in the storage unit 110 and considering touch preferences, the touch recognition controller 200 can determine a corresponding function according to detected touch movement. Specifically, in a page editing mode, the touch recognition controller 200 detects a touch on a specific thumbnail image of a page indicator including thumbnail images according to an embodiment of the present invention, and displays the touched thumbnail image in a current page or performs a corresponding function according to a movement of the touched thumbnail image. For example, if a single touch on a specific thumbnail image is detected, the touch recognition controller 200 can change a current page into a page corresponding to the touched thumbnail image. After a long press touch on a thumbnail image, if a drag and drop touch on a predetermined position is detected, the touch recognition controller 200 may move the corresponding thumbnail image to the predetermined position or delete the corresponding thumbnail image. Also, the touch recognition controller 200 may perform a corresponding function according to a long-press-touch, a drag-and-hold motion, and a hold time. This process will be described in detail later.

In the page editing mode, the touch recognition controller 200 may control the electronic device 100 to move a specific object included in a current page, to a corresponding position within the current page. For example, the touch recognition controller 200 may change a position of the object to a predetermined region of the current page, before confirming a drag and drop touch after a long press touch on the object and moving the object to the corresponding position or confirming a drag and hold touch and moving the object to the corresponding position.

The touch recognition controller 200 may also control the electronic device 100 to confirm a long press touch on an object in a basic page display screen and enter an object editing mode. In this case, until a time when the touch on the object is released, the object editing screen remains the same as a page editing screen. The touch recognition controller 200 may control the electronic device 100 to confirm touch preference of various schemes and perform a corresponding function according to object movement.

Also, a panning motion in the basic page display screen is detected, the touch recognition controller 200 may control the electronic device 100 to confirm the entire page and perform a page turning motion according to a predetermined panning length corresponding to the entire page.

The GUI controller 210 controls the electronic device 100 to execute the GUI program 114 stored in the program storage unit 111 and display a graphical user interface on the display unit 131. For example, the GUI controller 210 controls the electronic device 100 to display information of an application program driven in the application program driver 220, on the display unit 131. In another example, if the touch recognition controller 200 detects a long press touch on display information (e.g., an object, a thumbnail image and the like), a drag and drop touch, a drag and hold touch and the like, the GUI controller 210 controls the electronic device 100 to move the touched display information displayed on the display unit 131 to a specific page, a specific region of the page or the like and display the display information in the specific page, the specific region of the page or the like.

The application program driver 220 executes at least one application program 113 stored in the program storage unit 111 and provides a service according to the corresponding application program 113.

In another embodiment, the electronic device 100 may include a separate control module (not shown) for determining a touch function based on touch information.

Figure 3:
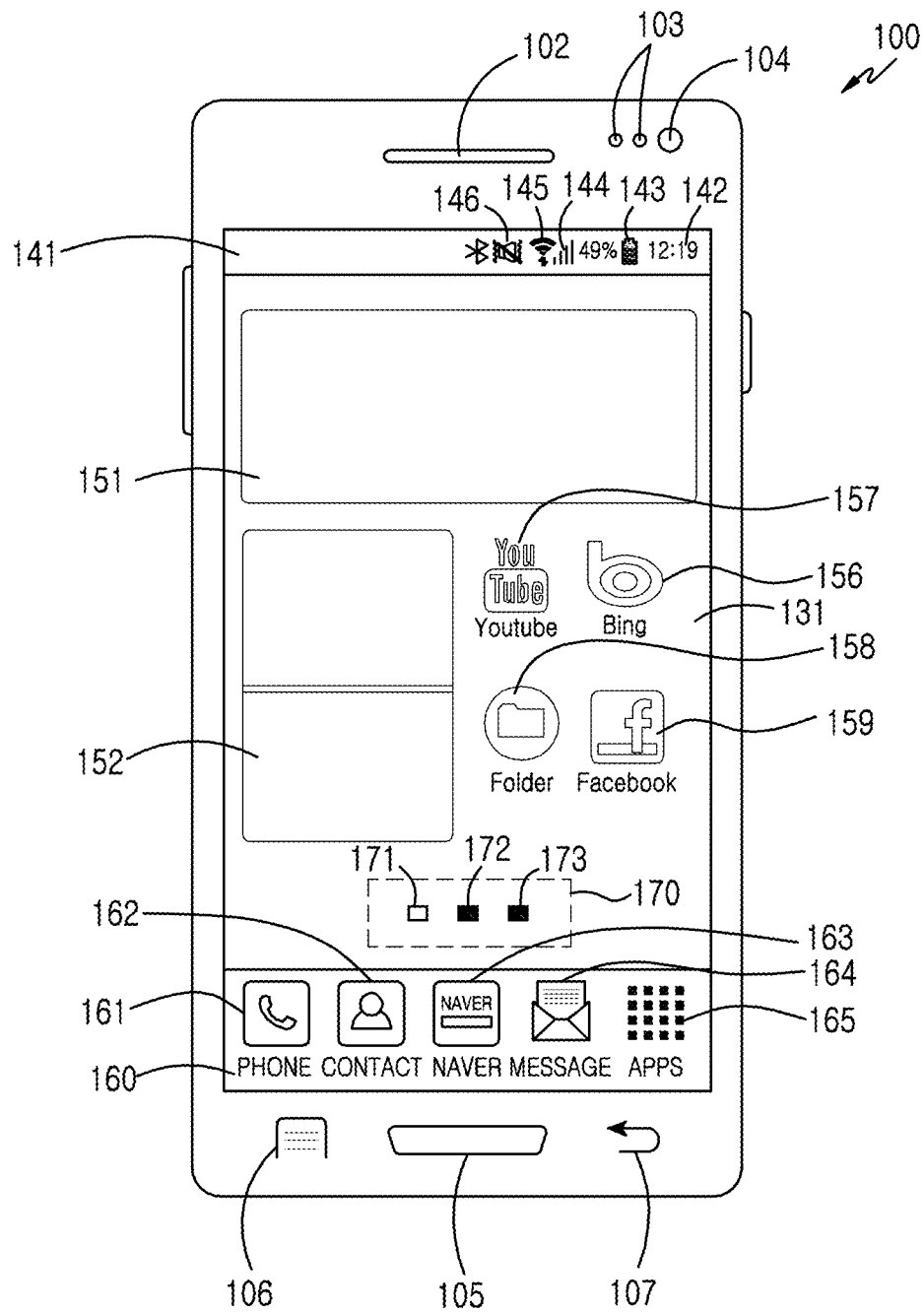
FIG. 3 is a diagram illustrating a page displayed in an electronic device according to an embodiment of the present invention.

FIG. 3 is a diagram illustrating a page displayed in an electronic device 100 according to an embodiment of the present invention. FIG. 3 illustrates a basic screen displayed when the electronic device 100 is woken up, that is, when a lock screen is released.

The display unit 131, which includes a touch screen region, is disposed in the electronic device 100. A speaker 102, a plurality of sensors 103 (e.g., an illumination sensor, a proximity sensor, and the like), and a camera module 104 are arranged above the display unit 131. A physical button 105 (i.e., a 'home button') is disposed below the display unit 131. If the physical button 105 is pressed, the physical button 105 can perform a function of temporarily or fully changing into a basic set screen in a function currently executed in the electronic device 100. Also, when the electronic device 100 is a mobile communication terminal, the physical button 105 may be used as a call start button. Accordingly, the physical button 105 is a push button which is easy to use by the user. This push button can be a key button having a metal dome which is installed on a substrate included in the electronic device 100 to provide a click sense to the user. Also, a touch padding button 106 can be disposed at one side of the physical button 105 and calls up a program or function displayed on the display unit 131. Another touch padding button 107 can be disposed at the other side of the physical button 105 and cancels a program or function displayed on the display unit 131. In the drawings, these buttons 105, 106, and 107 are provided outside of the display unit 131. However, these buttons 105, 106, and 107 may alternatively be displayed as elements on the display unit 131.

The display unit 131 can include a basic screen displayed when the electronic device 100 is woken up. The display unit 131 can arrange a plurality of objects 151, 152, 156, 157, 158, and 159 at predetermined intervals or in specific regions. The positions of the objects 151, 152, 156, 157, 158, and 159 may be changed by a user. The objects 151, 152, 156, 157, 158, and 159 may include widget icons 151 and 152 and program display icons 156, 157, 158, and 159 according to a user's preferences. Also, the objects 151, 152, 156, 157, 158, and 159 may further include shortcut icons executable by the user.

Generally, the objects 151, 152, 156, 157, 158, and 159 included in the electronic device 100 are only a few of a plurality of objects that may be displayed on the display unit 131. Accordingly, the currently displayed screen may be only one page among a plurality of pages, and the plurality of pages can be turned by a specific touch motion. This specific touch motion includes a swipe touch or panning touch of predetermined direction on a current page region. By the specific touch motion, the currently displayed screen can be changed to a subsequent or previous page.

Accordingly, there is a need for the user to know a total number of pages that exist in the electronic device 100 and to know which page is the currently displayed page. Accordingly, in the electronic device 100, an indicator 170 is provided generally in a lower area of the currently displayed page to provide a position of the currently displayed page and information relating to the page to a user. This indicator 170 may alternatively be disposed in a region outside of a page region which arranges a plurality of objects and changes according to page turning. Generally, the indicator 170 is not moved, even when the currently displayed screen is switched to a previous page or subsequent page by the aforementioned touch motion.

As illustrated in FIG. 3, the indicator 170 includes three markers 171, 172, and 173 and therefore, the electronic device 100 includes three pages. Also, the first marker 171 is highlighted and displayed at a different size than the other two markers 172 and 173, to inform the user that the currently displayed screen on the display unit 131 is the first page. If the display unit 131 moves the current page to the subsequent page, in response to a touch motion to display the next page, the second marker 172 of the indicator 170 is highlighted and displayed larger than the other markers 171 and 173.

A fixed menu region 160 may be provided at a lower region of the display unit 131, and include objects 161, 162, 163, 164, and 165 used for basic functions of the electronic device 100. For example, if the electronic device 100 is a mobile communication terminal, the fixed menu region 160 can include a dial icon 161, a contact icon 162, a message sending/reception icon 164, an application selection icon 165 and the like. A widely used Internet icon 163 and the like may also be disposed in the fixed menu region according to the user's preferences.

Additionally, a status bar 141 is provided at an upper region of the display unit 131 and informs the user of various status information of the electronic device 100. The status bar 141 may include a time icon 142, a battery level icon 143, signal strength icons 144 and 145 for wireless communication, an output notification information icon 146 of the electronic device 100 and the like.

Figure 4:
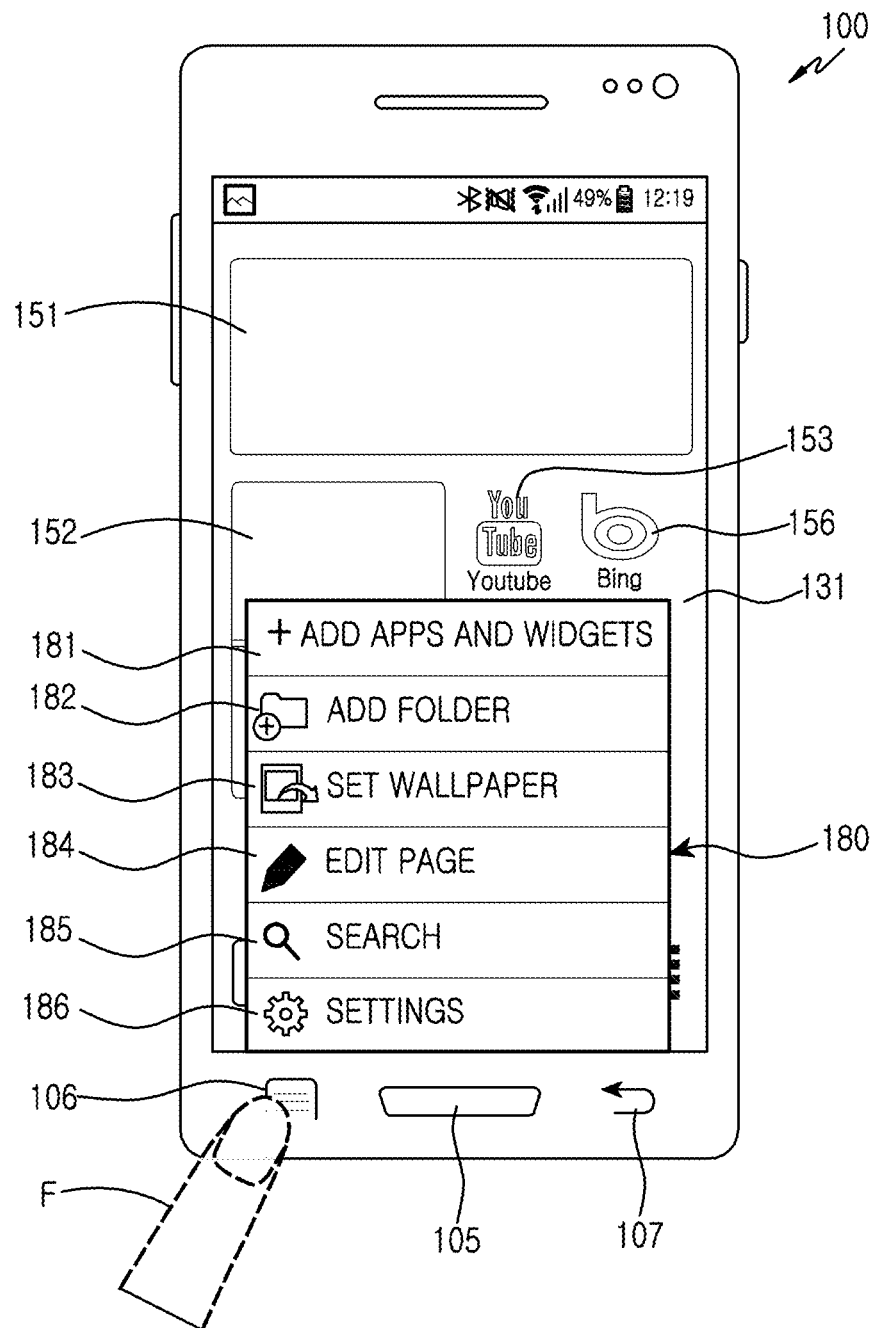
FIG. 4 is a diagram illustrating a menu screen for entering a page editing screen of an electronic device according to an embodiment of the present invention.

FIG. 4 is a diagram illustrating a menu screen for entering a page editing screen of the electronic device 100 according to an embodiment of the present invention.

Referring to FIG. 4, in a state where a current page is displayed, for example, if detecting that a setting key button 106 is pressed by a user's finger (F), a touch pen, and the like, the electronic device 100 can display a setting screen list 180. The setting screen list 180 may include, for example, 'add application and widget' 181, 'add folder' 182, 'set wallpaper' 183, 'search' 185, and 'settings' 186 and the like. The setting screen list 180 also includes 'edit page' 184 according to an embodiment of the present invention. Accordingly, when a user touches the 'edit page' 184, the electronic device 100 enters a screen of FIG. 6 according to an embodiment of the present invention.

This embodiment provides a screen for conveniently performing both a page editing function and an object movement function. Unlike the conventional art in which the electronic device can only provide page editing (excluding object editing) if entering the page editing function, the present invention can use both of the page editing function and the object movement function, improving user convenience. Accordingly, if entering the page editing function, the present invention can perform not only the page editing, but also the object editing, thereby providing a solution to the conventional problem of inconveniently entering a separate object editing screen to perform the object editing. Likewise, compared to the conventional art, in which, if entering the object editing screen, the electronic device performs only the object editing but cannot perform the page editing, the present invention can provide improved user convenience.

Figure 5:
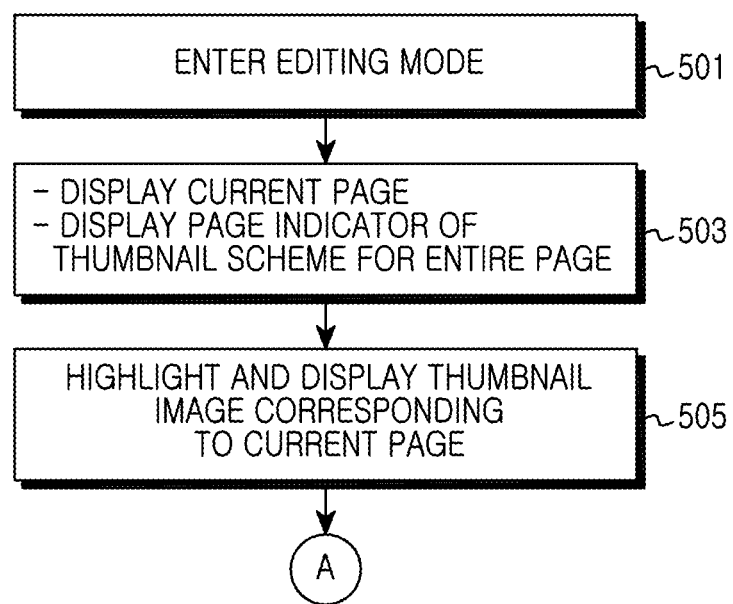
FIG. 5 is a flowchart illustrating a method for entering a page editing screen of an electronic device according to an embodiment of the present invention.

FIG. 5 is a flowchart illustrating a method for entering a page editing screen of an electronic device according to an embodiment of the present invention.

Figure 7:
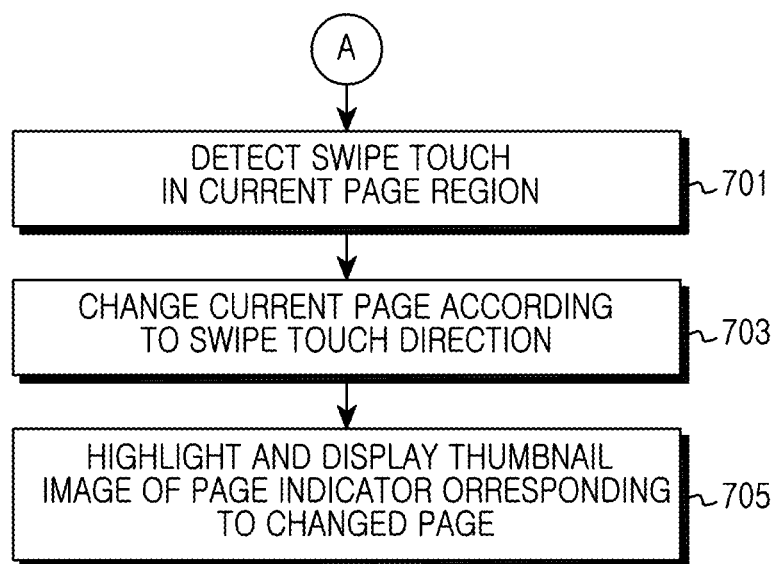
FIG. 7 is a flowchart illustrating a page change method according to an embodiment of the present invention.
Figure 9:
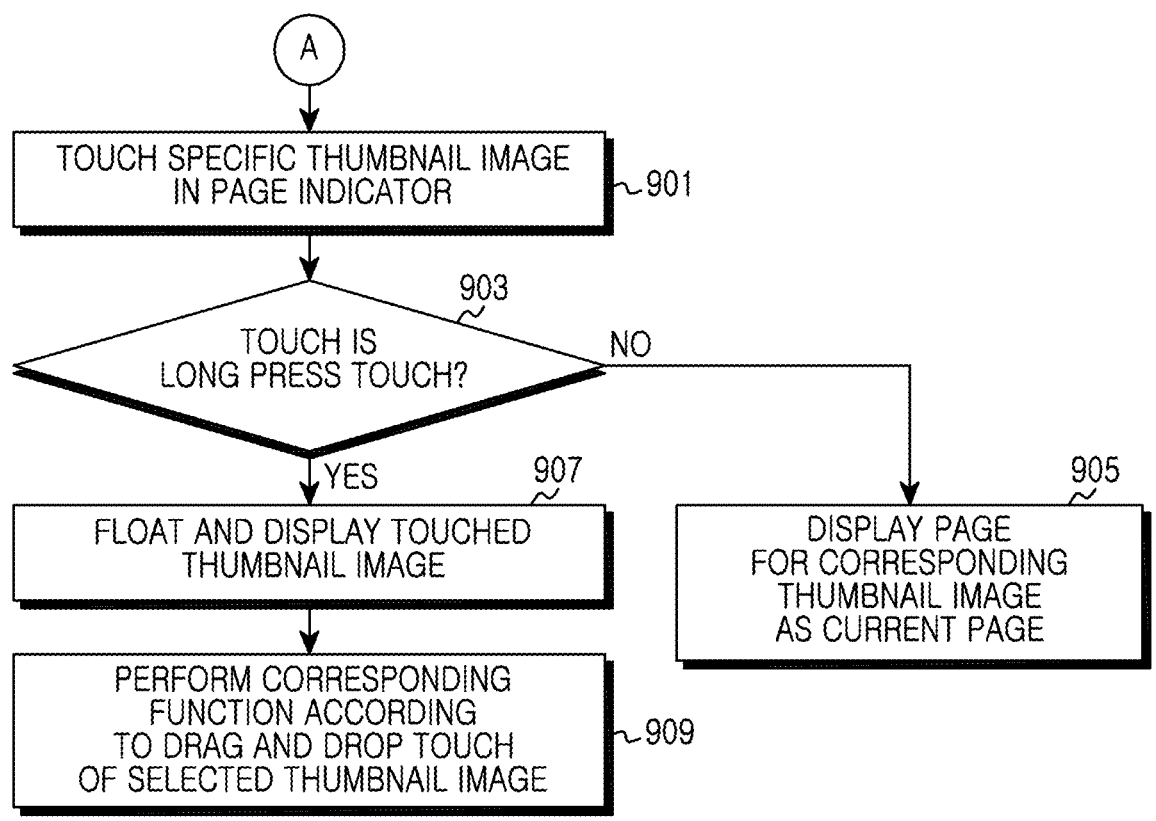
FIG. 9 is a flowchart illustrating a page editing method according to an embodiment of the present invention.
Figure 11:
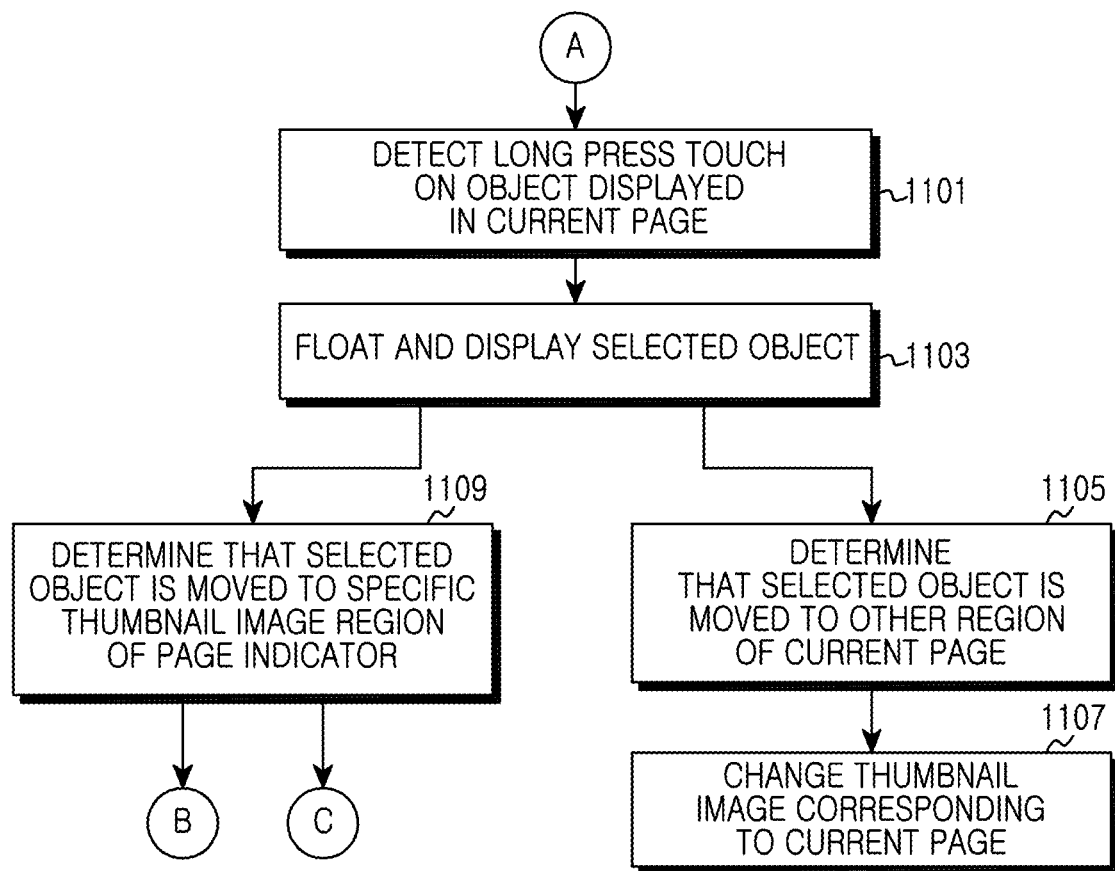
FIG. 11 is a flowchart illustrating an object move method according to an embodiment of the present invention.

Referring to FIG. 5, if it is detected that the 'edit page' 184 of FIG. 4 is selected from the setting screen list 180, the electronic device enters an editing mode in step 501. In step 503, the electronic device displays a current page and displays a page indicator using a thumbnail scheme for the plurality of pages. In step 505, the electronic device highlights and displays a thumbnail image, corresponding to the currently displayed page, in the page indicator. Next, the electronic device may perform various subsequent steps indicated by 'A' (FIGS. 7, 9, and 11).

In this embodiment, the user selects a separate setting item (i.e., the 'edit page' 184) to enter the page editing mode. However, the present invention is not limited to such. For example, the currently displayed page screen may be switched to the page editing screen by a pinch out touch.

Figure 6:
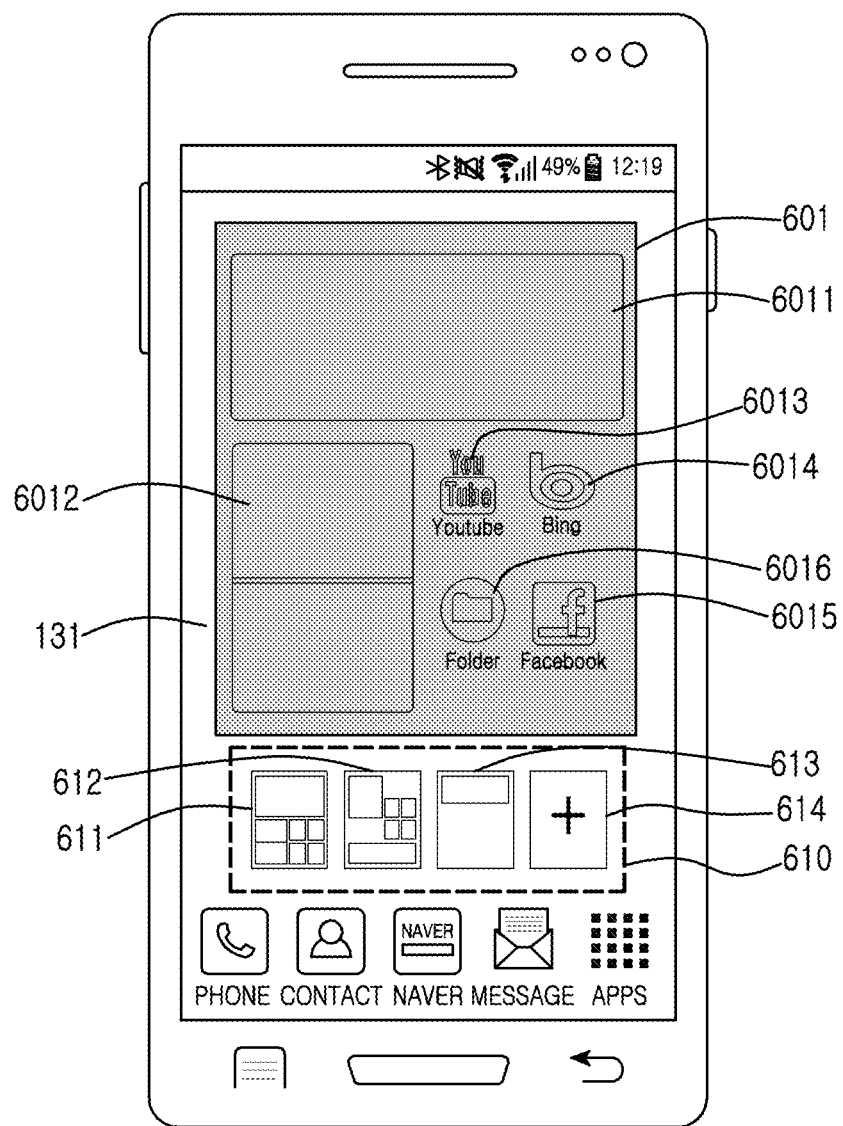
FIG. 6 is a diagram illustrating a page editing screen displayed on a display unit of an electronic device according to an embodiment of the present invention.

FIG. 6 is a diagram illustrating a page editing screen displayed on the display unit of the electronic device according to an embodiment of the present invention.

Referring to FIG. 6, a current page 601 is displayed at least smaller than a full screen of the display unit 131 in a page editing screen. Desirably, if the electronic device enters a page editing mode, the current page 601 may be floated and displayed. However, the entire screen is merely reduced for the current page 601 to a predetermined magnification before entering the page editing mode, and an arrangement relationship of objects 6011, 6012, 6013, 6014, 6015, and 6016 and the like remains unchanged.

A page indicator 610 is displayed in a region below the current page 601 and sequentially arranges thumbnail images 611, 612, and 613 corresponding to the plurality of pages. The page indicator 610 may further include a thumbnail image 614 for adding a page at a rightmost area of the page indicator 610. The thumbnail images 611, 612, and 613 corresponding to respective pages can display the arrangement relationship of objects in each of those corresponding pages. In this case, when relatively big and different widget icons are used, it is very advantageous in that a user can easily be aware of a structure of the corresponding page. Accordingly, it may be easy for the user to identify positions of widget icons in each of the thumbnail images 611, 612, and 613 and be roughly apprised of the content of the corresponding page.

Furthermore, the thumbnail image 611 corresponding to the current page 601 can be more highlighted and displayed compared to the thumbnail images 612 and 613 corresponding to the other pages. That is, the thumbnail image 611 can be displayed at a greater size than the other thumbnail images 612 and 613, or can be distinguished and displayed by brightening an edge region thereof. As illustrated in FIG. 6, the current page 601 displayed on the display unit 131 is the first page and, therefore, the first thumbnail image 611 of the page indicator 610 is displayed at a greater size than the other thumbnail images 612 and 613. So, the user is aware of which one of the plurality of pages is currently displayed.

FIG. 7 is a flowchart illustrating a page change method according to various an embodiment of the present invention.

Referring to FIG. 7, after step 505 of FIG. 5, in step 701, the electronic device 100 determines whether a swipe touch is detected in a current page region. If the swipe touch is detected, the electronic device 100 proceeds to step 703 and changes a current page according to swipe touch direction. That is, if a left or right swipe touch in the current page region is detected, the electronic device 100 displays a next page as the current page or a previous page, respectively, as the currently displayed page. Next, in step 705, the electronic device 100 highlights and displays a thumbnail image of a page indicator corresponding to the newly displayed page.

Figure 8A:
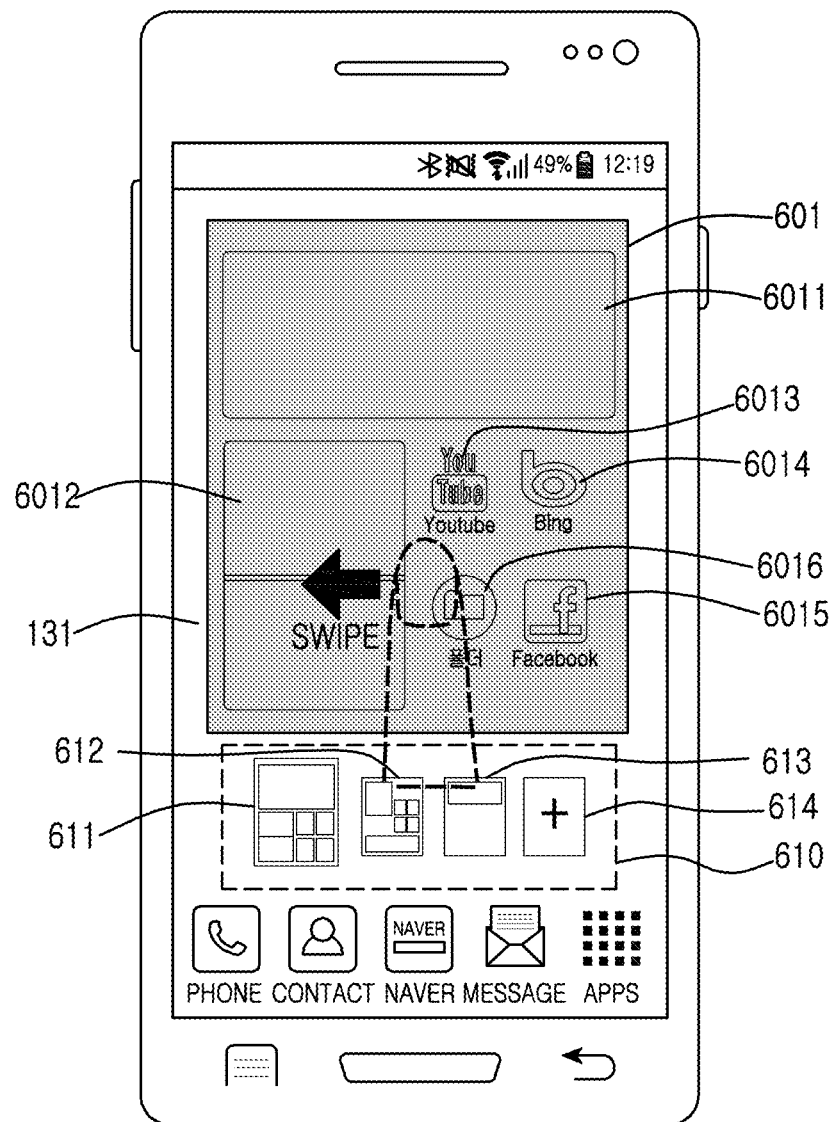
FIG. 8A and FIG. 8B are diagrams illustrating the method of FIG. 7.
Figure 8B:
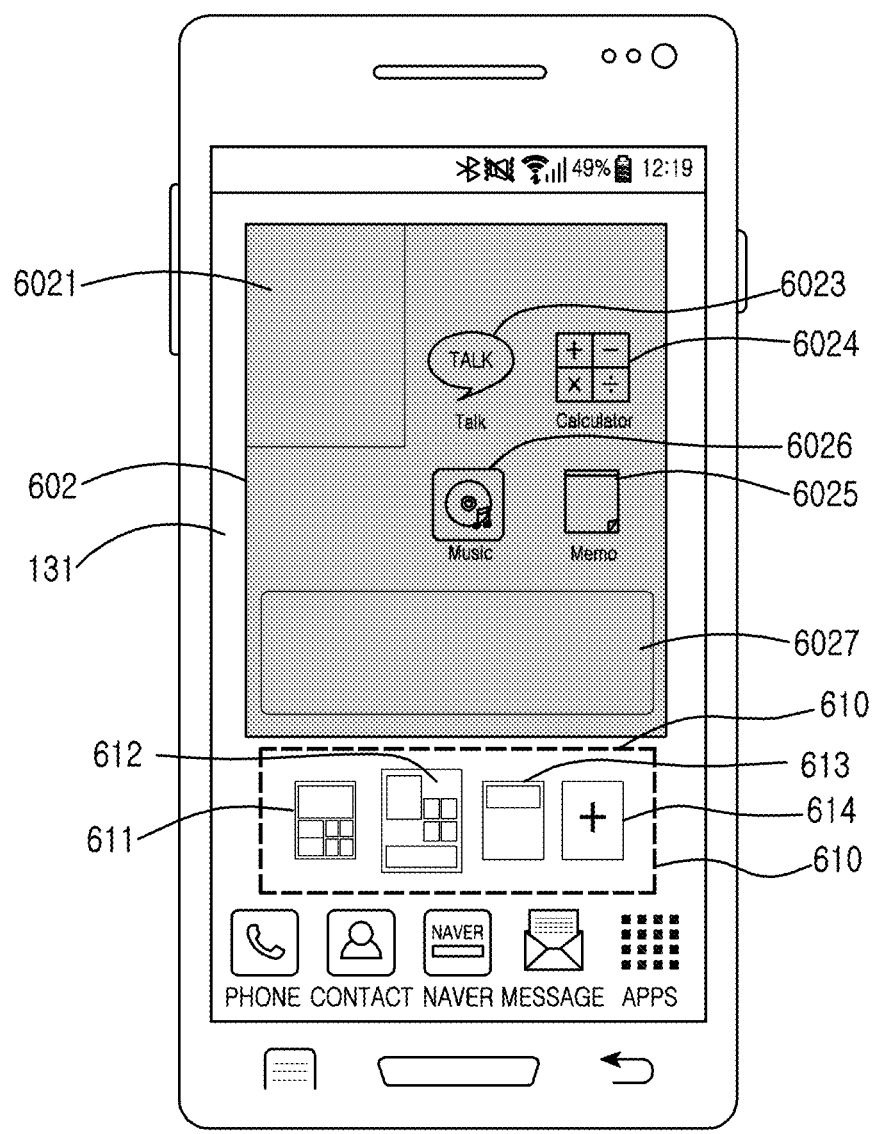

FIG. 8A and FIG. 8B are diagrams illustrating the method of FIG. 7. The electronic device can determine if a swipe touch on a region of the current page 601, displayed in a page editing mode state, is performed by a user's finger (F). In this case, the currently displayed page 601 (FIG. 8A) can be changed to a next page 602 (FIG. 8B) including other objects 6021, 6023, 6024, 6025, and 6026. Among the thumbnail images 611, 612, 613, and 614 of the page indicator 610, the second thumbnail image 612, corresponding to the page 602, can be highlighted and displayed larger than the other thumbnail images 611 and 613. Accordingly, if a user only looks at the page indicator 610, the user can know that the first page 601 previously displayed on the display unit 131 has been changed to the second page 602.

FIG. 9 is a flowchart illustrating a page editing method according to an embodiment of the present invention.

Referring to FIG. 9, after step 505 of FIG. 5, the electronic device 100 proceeds to step 901 and determines if a specific thumbnail image has been touched in a page indicator. Next, in step 903, the electronic device 100 determines if the touch on the specific thumbnail image is a long press touch. If it is determined that the touch on the specific thumbnail image is the long press touch, the electronic device 100 proceeds to step 907 and floats and displays the touched thumbnail image. Next, in step 909, the electronic device 100 performs a corresponding function according to a drag and drop touch of the selected thumbnail image.

Alternatively, if it is determined, in step 903, that the touch on the specific thumbnail image is not the long press touch, the electronic device 100 changes, in step 905, a currently displayed page to a page corresponding to the specific thumbnail image that was touched. In this case, though not illustrated, the thumbnail image corresponding to the changed current page can be highlighted and displayed.

Figure 10:
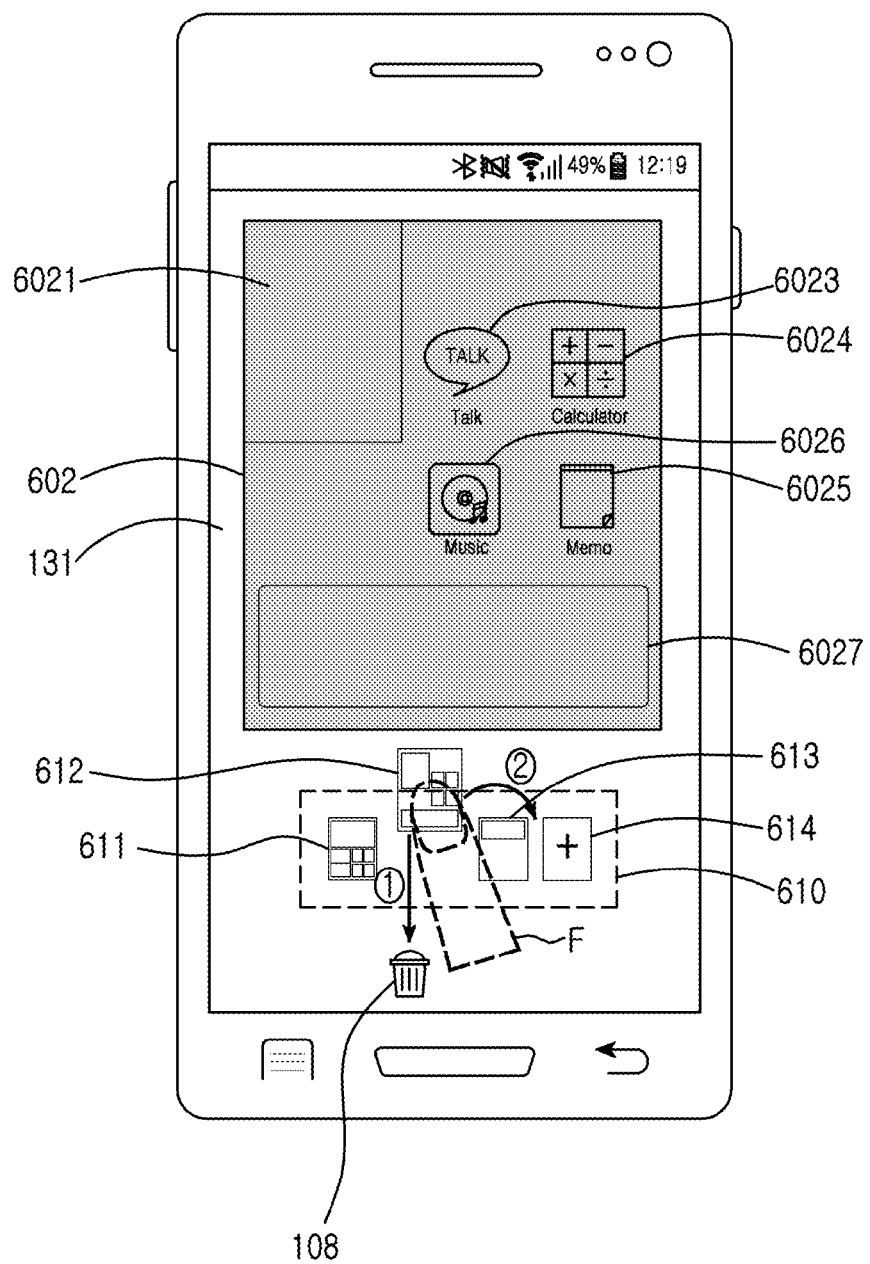
FIG. 10 is a diagram illustrating the method of FIG. 9.

FIG. 10 is a diagram illustrating the method of FIG. 9.

Referring to FIG. 10, if a long press touch on a thumbnail image 612, corresponding to the second page 602 in a page indicator 610, is detected, the electronic device 100 floats and displays the corresponding thumbnail image 612. Concurrently, the electronic device 100 displays, as the current page, the second page 602, corresponding to the floated thumbnail image 612. As previously mentioned, the second page 602 can include and display a plurality of objects 6021, 6023, 6024, 6025, and 6026.

In a state where a user holds the touch on the thumbnail image 612, if a drag and drop touch on the thumbnail image 612 is detected, the electronic device 100 can perform a corresponding function corresponding to a region to which the thumbnail image 612 is moved (i.e., dropped).

For example, as indicated by ① of FIG. 10, if the user drags and drops the thumbnail image 612 in a wastebasket region 108, the electronic device 100 can determine this action as a deletion of the corresponding page 602 and delete not only the corresponding page 602, but also the objects 6021, 6023, 6024, 6025, and 6026 included in the corresponding page 602. The electronic device 100 may previously inform the user of the existence or non-existence of the corresponding objects 6021, 6023, 6024, 6025, and 6026 and receive a reselection for deletion from the user.

Also, as indicated by ② of FIG. 10, if the user drags and drops the thumbnail image 612 between the thumbnail image 613, corresponding to the third page, and the thumbnail image 614 for page addition, the thumbnail image 612, corresponding to the second page 602, may placed between the third thumbnail image 613 and the page addition thumbnail image 614.

FIG. 11 is a flowchart illustrating an object move method according to an embodiment of the present invention.

Referring to FIG. 11, after step 505 of FIG. 5, the electronic device 100 proceeds to step 1101 and detects a long press touch on an object displayed in a current page. Next, the electronic device 100 proceeds to step 1102 and floats and displays the selected object and then, determines whether step 1105 or step 1109 is carried out. In step 1105, the electronic device 100 determines that the selected object is moved to another region of the current page. In this case, the electronic device 100 proceeds to step 1107 and changes a thumbnail image, corresponding to the current page, into a thumbnail image, corresponding to the current page in which the selected object has been moved. That is, the new arrangement of icons is reflected in the changed thumbnail image.

Figure 15:
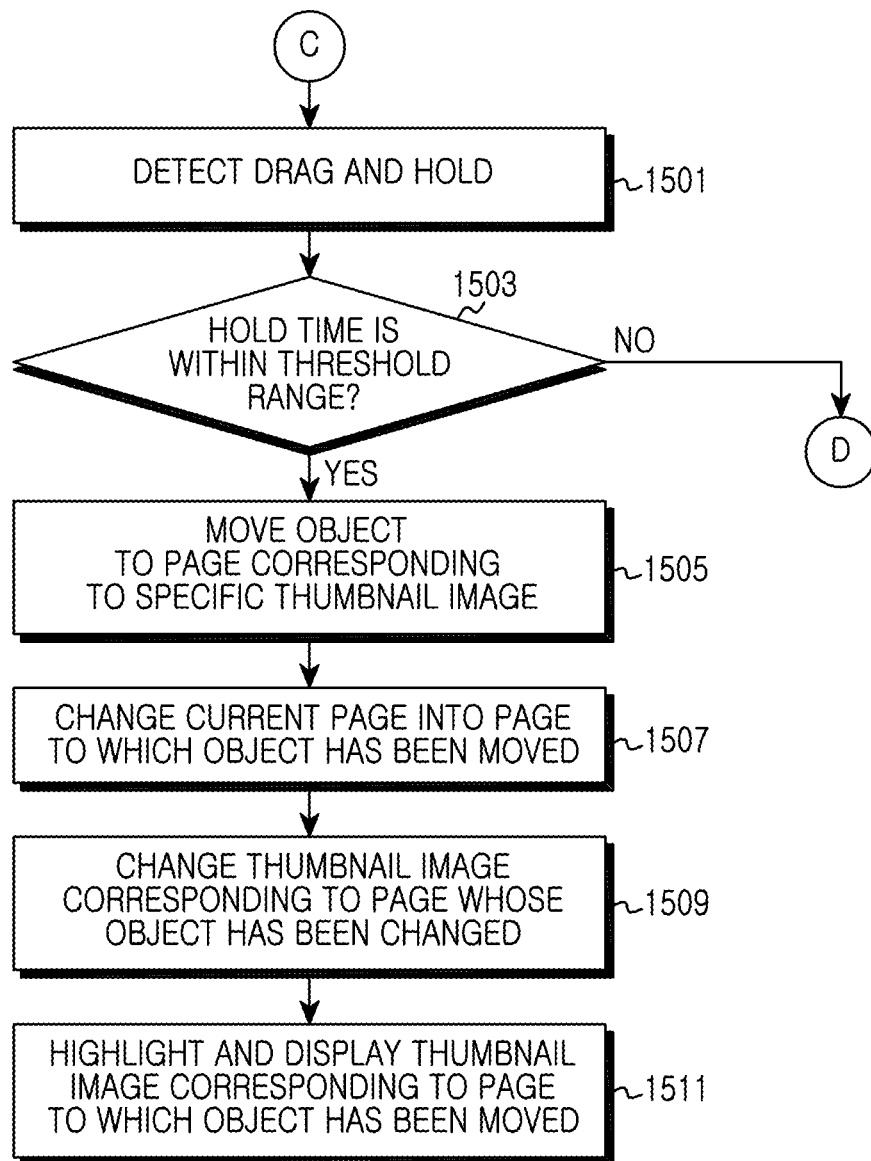
FIG. 15 is a flowchart illustrating an object move method according to an embodiment of the present invention.

Alternatively, in step 1109, the electronic device 100 determines that the object selected in step 1103 is moved to overlap with a specific thumbnail image in the page indicator and then, continuously perform step 'B' (FIG. 13) or step 'C' (FIG. 15).

Figure 12A:
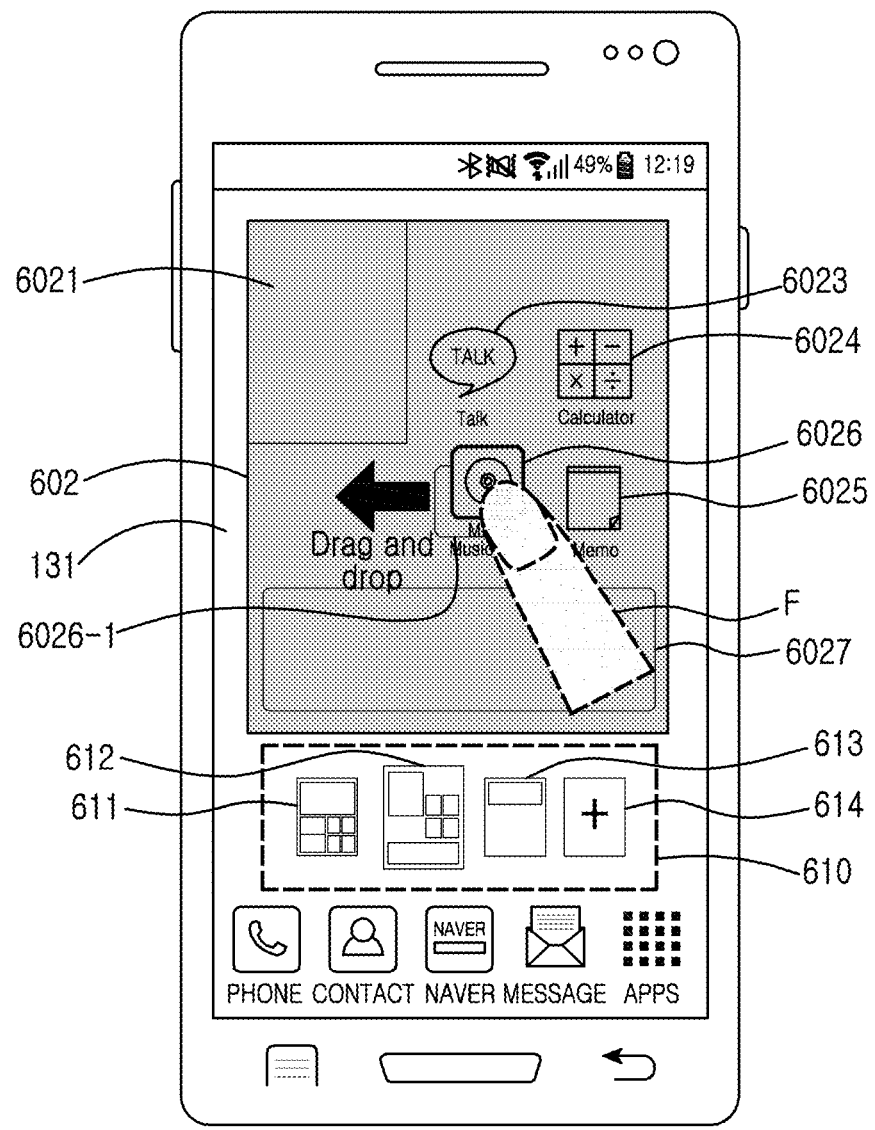
FIG. 12A and FIG. 12B are diagrams illustrating the method of FIG. 11.
Figure 12B:
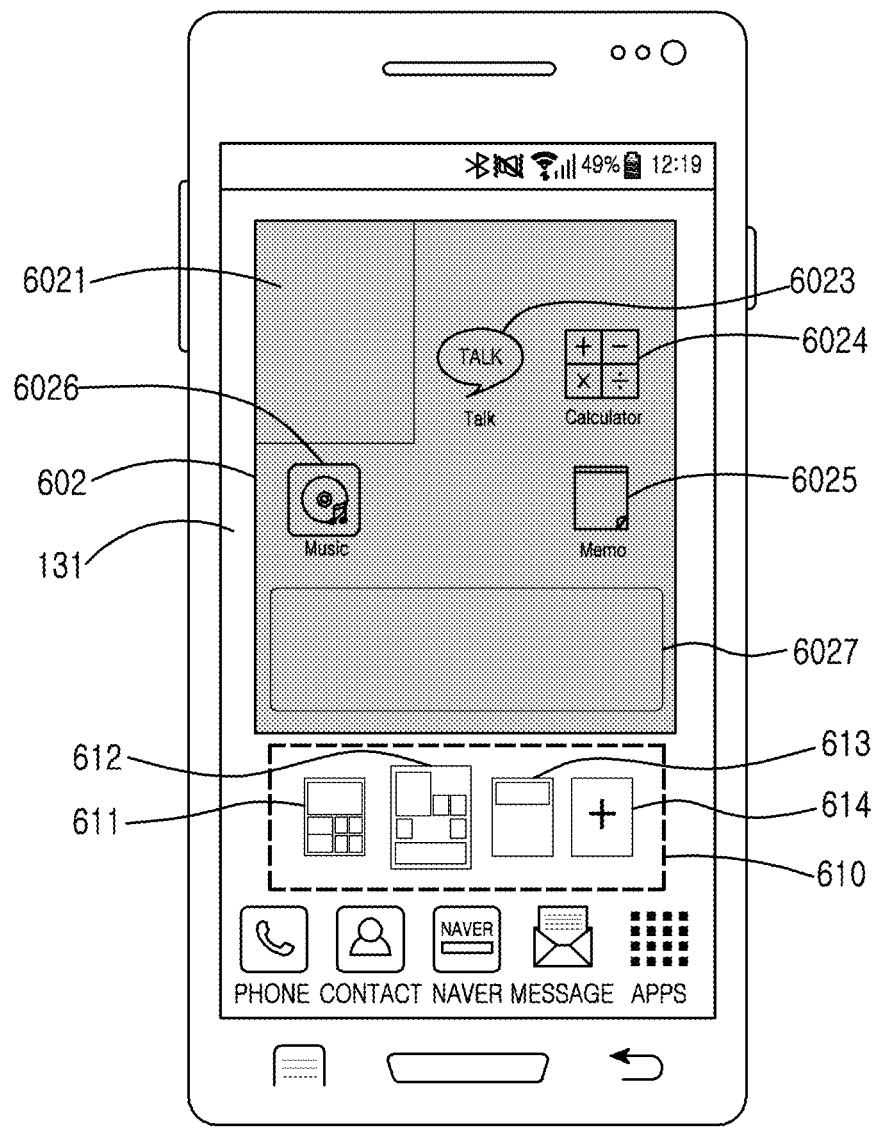

FIG. 12A and FIG. 12B are diagrams illustrating the method of FIG. 11.

Referring to FIG. 12A, if detecting a long press touch on a specific object 6026 among the plurality of objects 6021, 6023, 6024, 6025, and 6026 of the second page 602, the electronic device 100 floats and displays the object 6026, and displays a shadow image 6026-1 matching with a shape of the object 6026 at a lower side of the object 6026. The shadow image 6026-1 can be formed to have the same size as the selected object 6026 but is not the same as the object 6026. Accordingly, if the object 6026 is moved, the shadow image 6026-1 is also moved. This not only provides a three-dimensional effect, based on movement, to a user, but also helps the user easily select a region to place the object 6026 hidden by a finger.

Referring to FIG. 12B, the object 6026 selected by the user has been moved to a left region of the current page 602 and, according to this movement, the second thumbnail image 612 of the page indicator 610 is changed to reflect the changed arrangement relationship of the objects 6021, 6023, 6024, 6025, and 6026 of the current page 602.

A description related to step 1109 will be described later.

Figure 13:
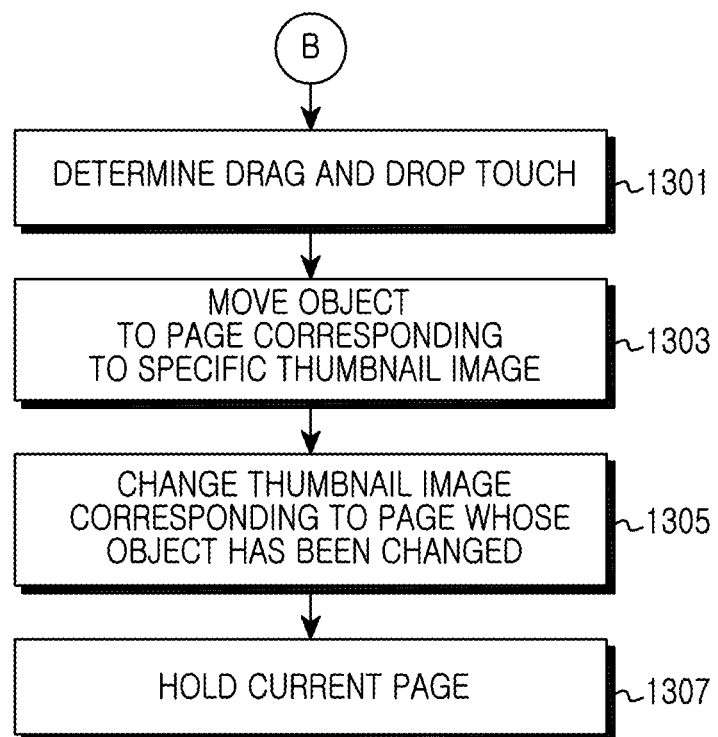
FIG. 13 is a flowchart illustrating an object move method according to an embodiment of the present invention.

FIG. 13 is a flowchart illustrating an object move method according to an embodiment of the present invention.

Referring to FIG. 13, after step 1109 of FIG. 11, if it is determined that a touch motion for an object moved to overlap with a specific thumbnail image region is a drag and drop touch in step 1301, the electronic device proceeds to step 1303 and moves the object to a page corresponding to the specific thumbnail image. Subsequently, the electronic device proceeds to step 1305 and changes the thumbnail images corresponding to the page from which the object has been removed and the page to which the object has been moved. However, in step 1307, the electronic device continues to display a previously displayed page on the display unit (i.e., the page from which the object has been removed).

Figure 14A:
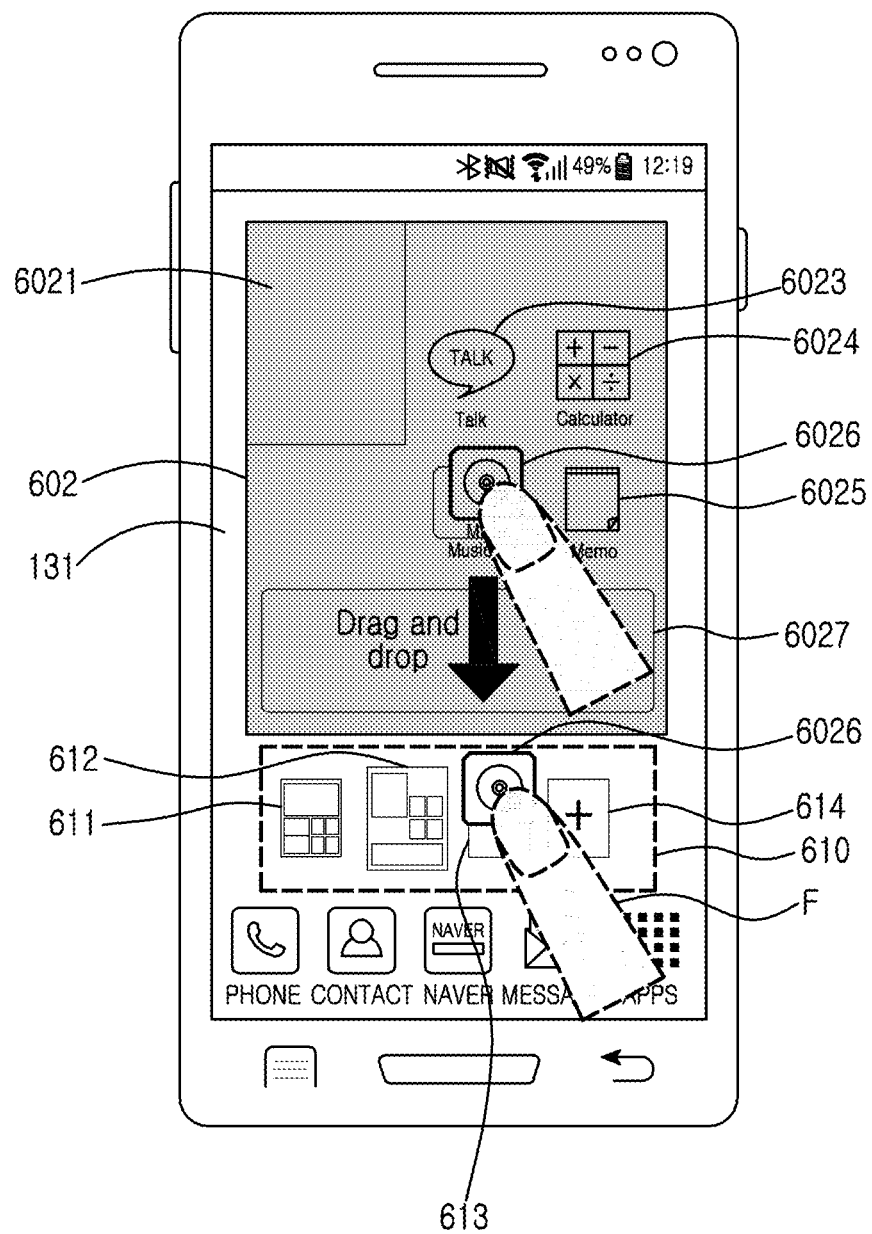
FIG. 14A and FIG. 14B are diagrams illustrating the method of FIG. 13.
Figure 14B:
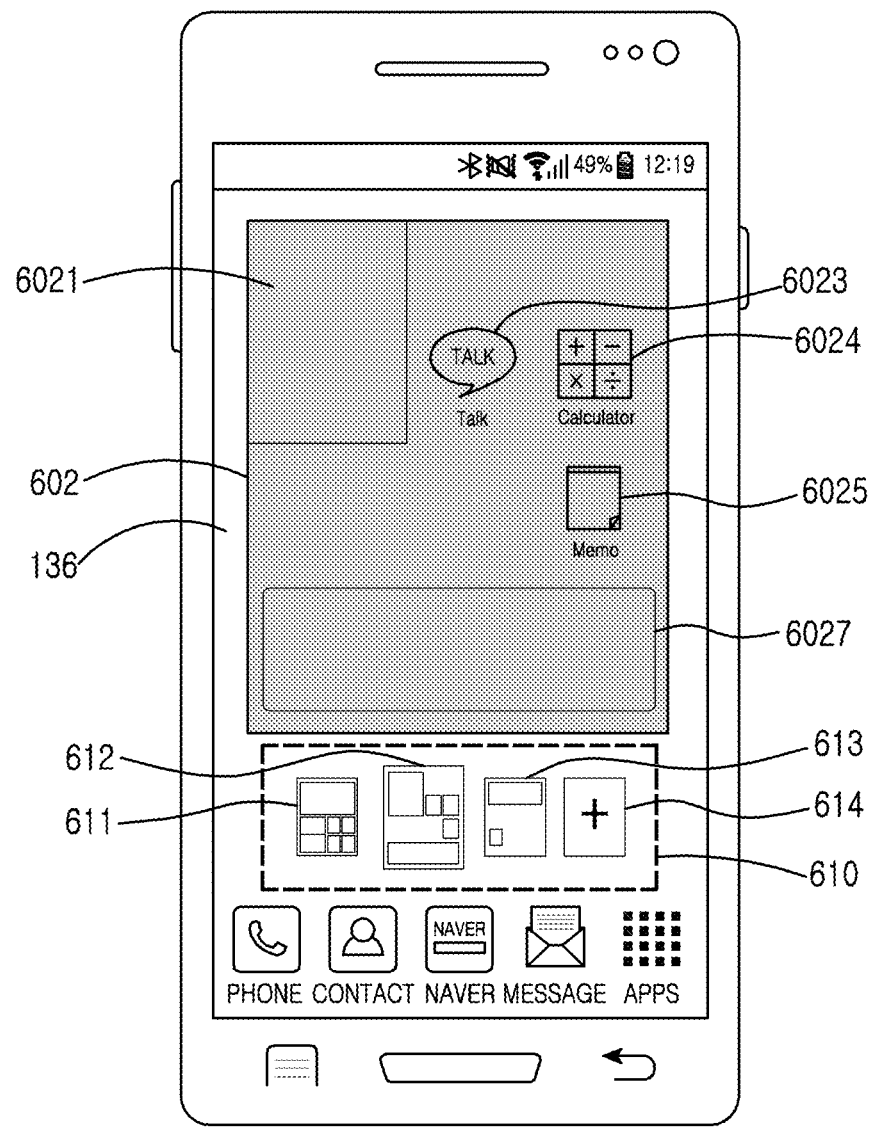

FIG. 14A and FIG. 14B are diagrams illustrating the method of FIG. 13.

As illustrated, if a long press touch on a specific object 6026, among a plurality of objects 6021, 6023, 6024, 6025, and 6026 included in a page 602 currently displayed on the display unit 131, is detected, the electronic device 100 floats and displays the selected object 6026 and also displays a shadow image 6026-1. Next, the electronic device 100 determines that the user drags the selected object 6026 in the direction of an arrow of FIG. 14A and drops the object 6026 in a region corresponding to a specific thumbnail image 613 of a page indicator 610.

In this diagram, after the long press touch on the specific object 6026 of the second page 602, the user drags and drops the object 6026 in the region of the thumbnail image 613 corresponding to the third page 603 of the page indicator 610. In this case, as illustrated in FIG. 14B, a current page displayed on the display unit 131 continues to display the second page 602 but is displayed with the object 6026 missing. Also, because the current page displayed on the display unit 131 is the second page 602, the second thumbnail image 612 of the page indicator 610 remains highlighted and displayed.

Also, the movement of the object 6026 from the second page 602 to the third page 603 changes structures of the corresponding thumbnail images 612 and 613 of the page indicator 610. For example, the second thumbnail image 612, corresponding to the second page (current page) 602, of the page indicator 610 is displayed with the object 6026 missing, while the third thumbnail image 613 is changed and displayed with the object 6026 being present.

That is, when an object included in a current page is moved to a corresponding thumbnail image region, corresponding to another page, by a drag and drop touch motion after a long press touch on the object, only the object is moved to a corresponding page and the current page is continues to be displayed.

FIG. 15 is a flowchart illustrating an object move method according to an embodiment of the present invention.

Figure 17:
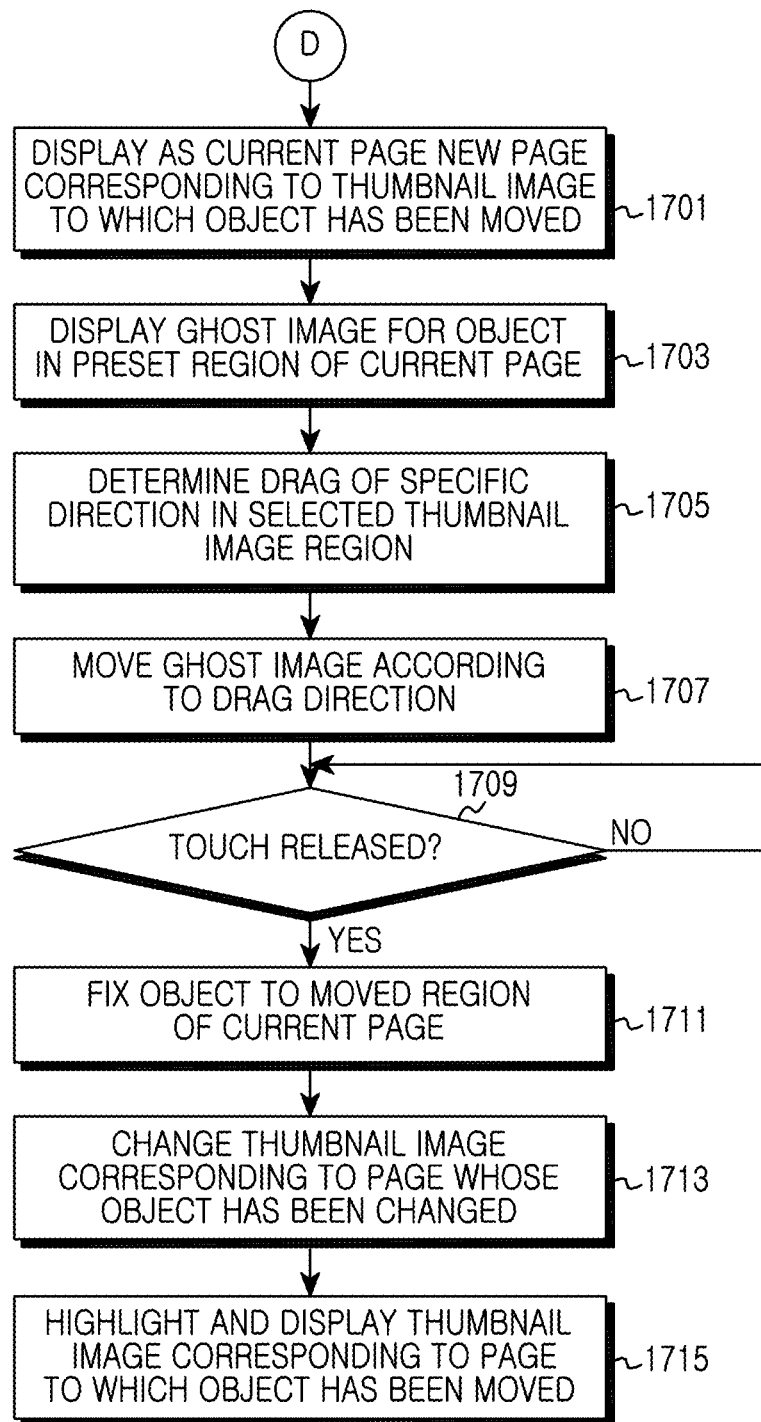
FIG. 17 is a flowchart illustrating an object move method according to an embodiment of the present invention.

Referring to FIG. 15, after step 1109 of FIG. 11, if it is determined that a touch motion for an object moved to a specific thumbnail image region is a drag and hold in step 1501, the electronic device proceeds to step 1503 and determines if a hold time of holding the selected object in the specific thumbnail image region is within a threshold range. If it is determined, in step 1503, that the hold time is greater than a preset threshold range, the electronic device proceeds to step 'D' (FIG. 17).

Alternatively, if it is determined, in step 1503, that the hold time is within the preset threshold range, the electronic device proceeds to step 1505 and moves the object to a page corresponding to the specific thumbnail image. Here, the hold time within the preset threshold range represents a state of confirming that a touch and hold time is longer than a drag and drop and a touch is released within the threshold range.

Next, the electronic device proceeds to step 1507 and changes a page currently displayed on the display unit 131 to the page to which the object has been moved, and displays the page to which the object has been moved. Subsequently, in step 1509, the electronic device changes the thumbnail images corresponding to the page from which the object has been removed and the page to which the object has been moved and then, proceeds to step 1511 and highlights and displays the thumbnail image corresponding to the page to which the object has been moved.

Figure 16A:
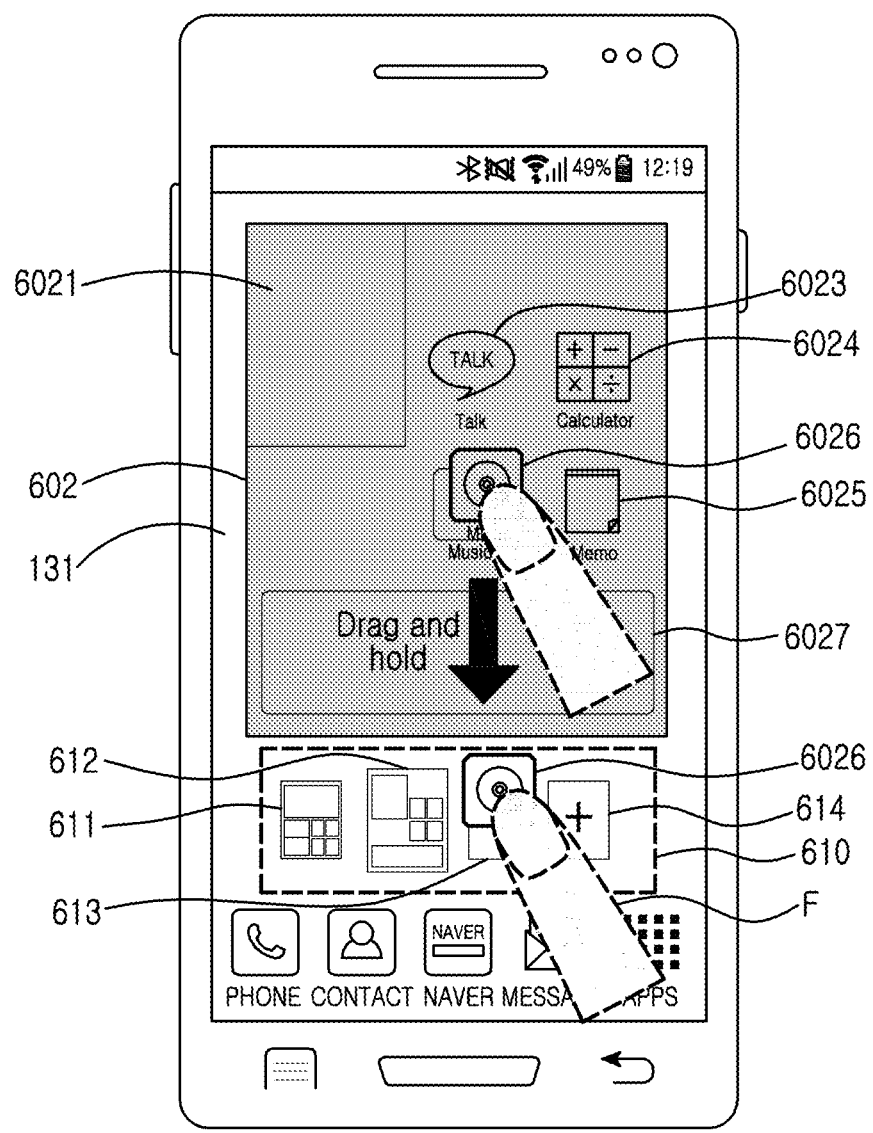
FIG. 16A and FIG. 16B are diagrams illustrating the method of FIG. 15.
Figure 16B:
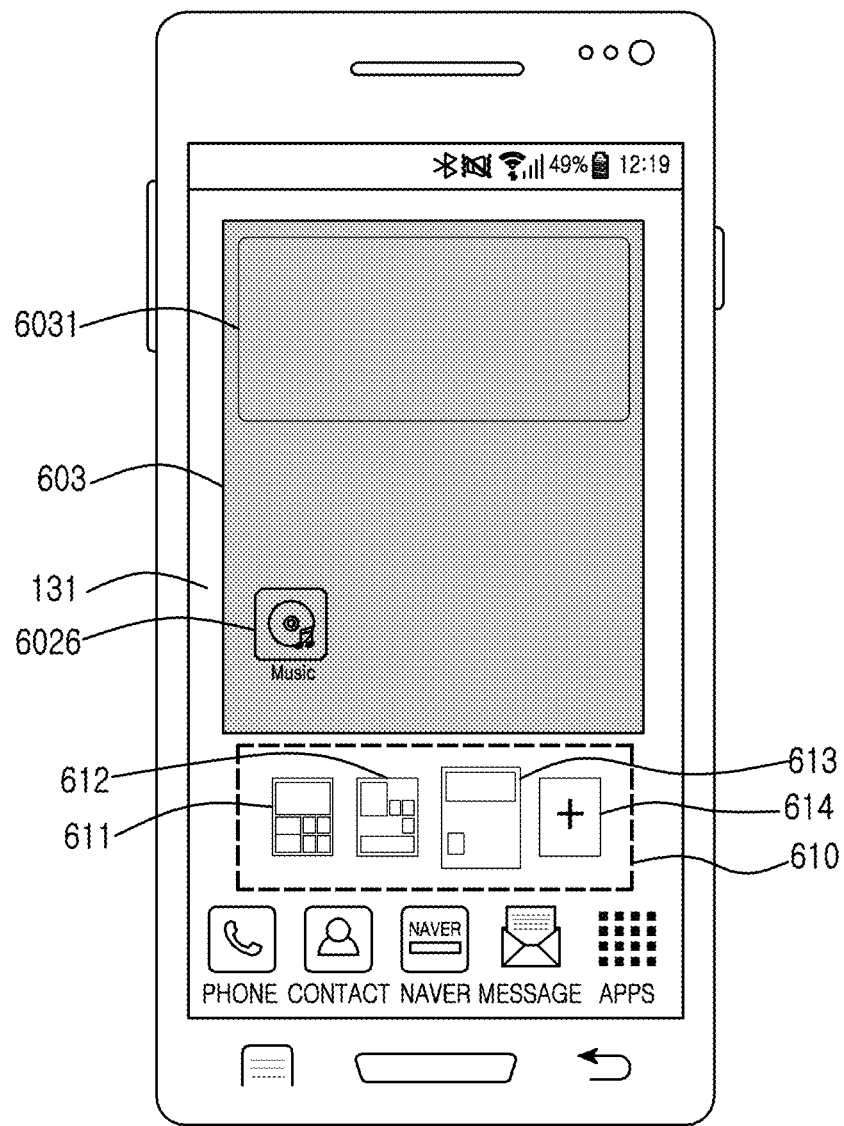

FIG. 16A and FIG. 16B are diagrams illustrating the method of FIG. 15.

As illustrated in FIG. 16A, if a long press touch on a specific object 6026, among a plurality of objects 6021, 6023, 6024, 6025, and 6026 included in a page 602 currently displayed on the display unit 131, is detected, the electronic device floats and displays the selected object 6026 and also displays a shadow image 6026-1. Subsequently, the electronic device determines that the user drags the selected object 6026 in the direction of an arrow of FIG. 16A and holds the object 6026 to overlap with a region of a specific thumbnail image 613 of a page indicator 610 within a threshold time.

In this embodiment, after the long press touch on the specific object 6026 of the second page 602, the user drags the object 6026 to the region of the thumbnail image 613, corresponding to the third page 603, of the page indicator 610 and then holds the object 6026 until a threshold time. In this case, as illustrated in FIG. 16B, the current page 602 displayed on the display unit 131 is changed to the third page 603 to which the object 6026 is moved. Also, because a page currently displayed on the display unit 131 is the third page 603, the third thumbnail image 613 of the page indicator 610 can be changed, highlighted, and displayed.

Also, the movement of the object 6026 changes structures of the corresponding thumbnail images 612 and 613 of the page indicator 610. For example, the thumbnail image 612 corresponding to the second page (current page) 602 of the page indicator 610 is displayed with the object 6026 missing, and the third thumbnail image 613 is changed and displayed with the object 6026 present.

That is, after a long press touch on an object included in a current page, when a user moves the object to overlap with a corresponding thumbnail image region by a drag and hold touch motion within a predetermined threshold time, the current page is also changed into a page to which the object has been moved, together with the object.

Accordingly, after a long press touch on an object included in a current page, a user performs a drag and drop or a drag and hold motion up to a thumbnail image to which it is intended to move the object, thereby being able to move only the object to a desired page or easily change the current page into a page to which the object has been moved together with the object.

FIG. 17 is a flowchart illustrating an object move method according to an embodiment of the present invention.

Referring to FIG. 17, after a drag and hold touch on an object in a corresponding thumbnail image region is detected in step 1503 of FIG. 15, if continuous touch is held for a hold time exceeding a threshold range, in step 1701, the electronic device 100 switches from a current page to a new page corresponding to a thumbnail image to which the object has been moved and displays the new page on the display unit. Next, in step 1703, the electronic device displays a ghost image of the object intended to be moved to a preset region of the new page. Here, the preset region represents a vacant region where no object exists in the new page. Also, the preset region can be, for example, a vacant region which gives priority to the left and gives priority to the uppermost. Also, the ghost image, which is a virtual image of the object intended to be moved, may include known dotted-line or blurred image techniques and the like.

Subsequently, if a drag of a specific direction in the selected thumbnail image region is determined in step 1705, the electronic device proceeds to step 1707 and moves the ghost image according to the drag direction in the new page. Next, if it is determined in step 1709 that the touch is released, the electronic device proceeds to step 1711 and places the selected object instead of the ghost image to a moved region of the new page. Next, in step 1713, the electronic device changes a thumbnail image corresponding to the new page whose arrangement has been changed. Subsequently, in step 1715, the electronic device highlights and displays the thumbnail image corresponding to the new page to which the object has been moved.

Figure 18A:
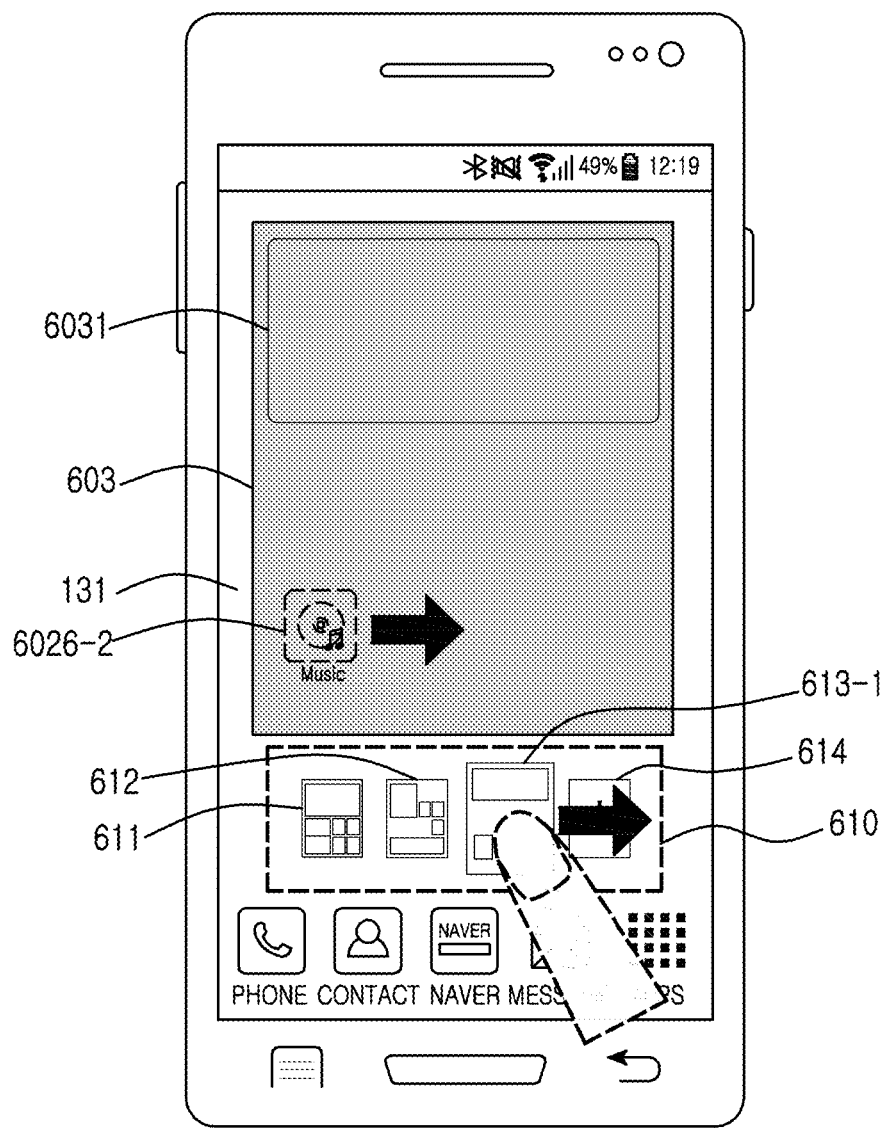
FIG. 18A and FIG. 18B are diagrams illustrating the method of FIG. 17.
Figure 18B:
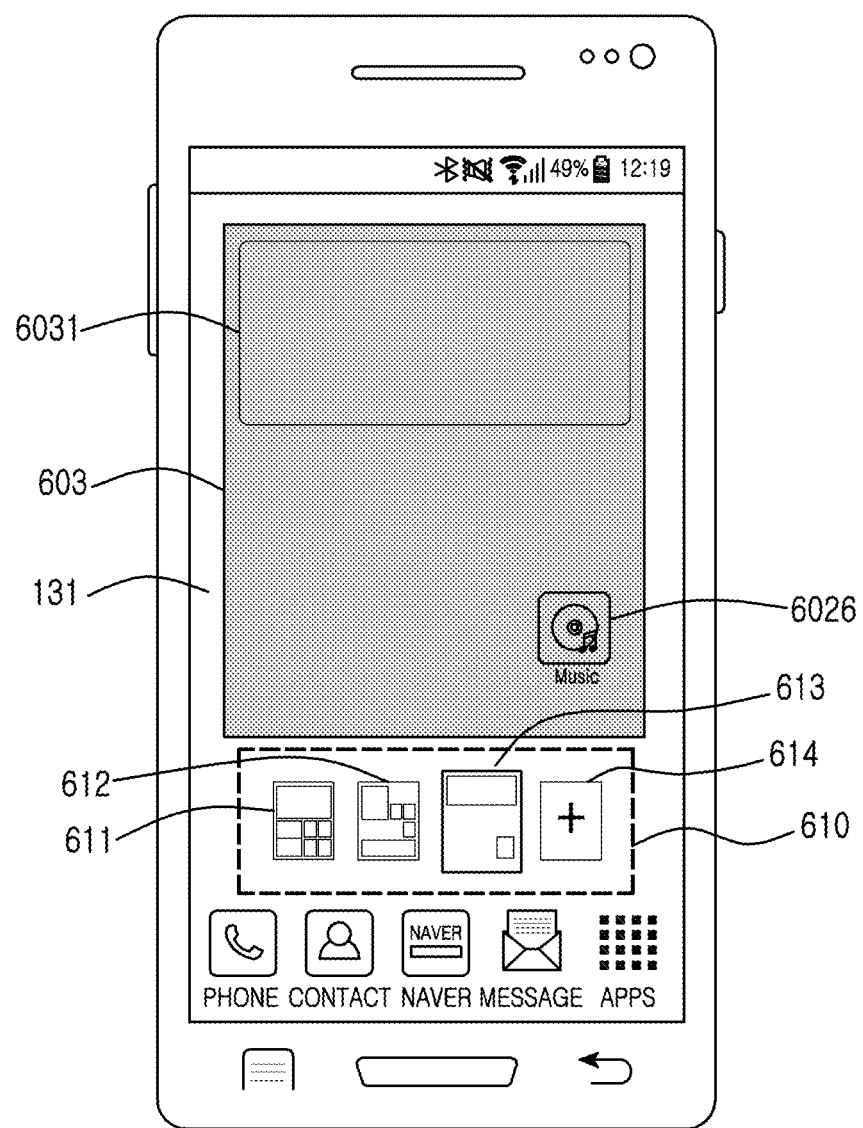

FIG. 18A and FIG. 18B are diagrams illustrating the method of FIG. 17.

As illustrated in FIG. 18A, after detecting a drag and hold touch on an object 6026 in a region of a corresponding thumbnail image 613 of a page indicator 610, if continuous touch is held for a hold time exceeding a threshold range, the electronic device 100 enlarges and displays, as a dragging image 613-1, the region of the corresponding thumbnail image 613 where the object 6026 is located. For example, the dragging image 613-1 for the corresponding thumbnail image 613 can be displayed to have a greater size than the highlighted and displayed thumbnail image 613. This is to improve the direction movement of the object 6026 within a region of the dragging image 613-1 for the corresponding thumbnail image 613.

Concurrently, a current page displayed on the display unit 131 is changed a new page 603 corresponding to the thumbnail image 613 to which the object 6026 is moved. The original region of the ghost image 6026-2 of the corresponding object 6026 becomes a vacant region within the new page 603.

In this diagram, the object 6026 included in the second page 602 is moved to the third page 603 through a long press touch and a drag and hold motion to a region of the third thumbnail image 613. Accordingly, the currently displayed page on the display unit 131 is changed to the third page 603. Also, the ghost image 6026-2 of the object 6026 can be displayed in a vacant region of the third page 603. In FIG. 18A, the object 6026 is moved in the arrow direction (to the right) and, according to this, the ghost image 6026-2 of the object 6026 displayed in the current page 603 is moved to the right.

That is, by merely holding a touch on an object that has been moved to the page indicator 610 through a drag and hold motion for a time greater than a threshold range, the user can conveniently move the object to a desired region of a corresponding page.

FIG. 18B illustrates a state of confirming a touch release after a drag motion for the object 6026 and placing the object 6026 in a desired position of the third page 603. In this case, the object 6026 is moved to the right of the third page 603, which is the currently displayed page on the display unit 131. Accordingly, the second thumbnail image 612 is changed a state in which the object 6026 is deleted and the third thumbnail image 613 is changed to a state in which the object 6026 is moved to the rightmost region of the third page 603. Also, because the third thumbnail image 613 corresponds to the currently displayed page 603 of the display unit 131, the third thumbnail image 613 is highlighted and displayed.

FIG. 19 to FIG. 22 are flowcharts illustrating methods for moving an object in a state of a long press touch on the object without a separate editing screen according to an embodiment of the present invention.

In the aforementioned embodiments, a description has been made for a method of performing page editing and object movement by entering a separate page editing mode. This embodiment is advantageous for continuous page editing and movement of many objects because the page editing mode is not released even after completion of the page editing and the object movement.

This embodiment proposes a method capable of conveniently performing the movement of a single object without entering a separate page editing mode. This embodiment can be more convenient for object movement because, if the selected object is moved, an object movement mode is automatically released without a separate release motion.

Figure 19:
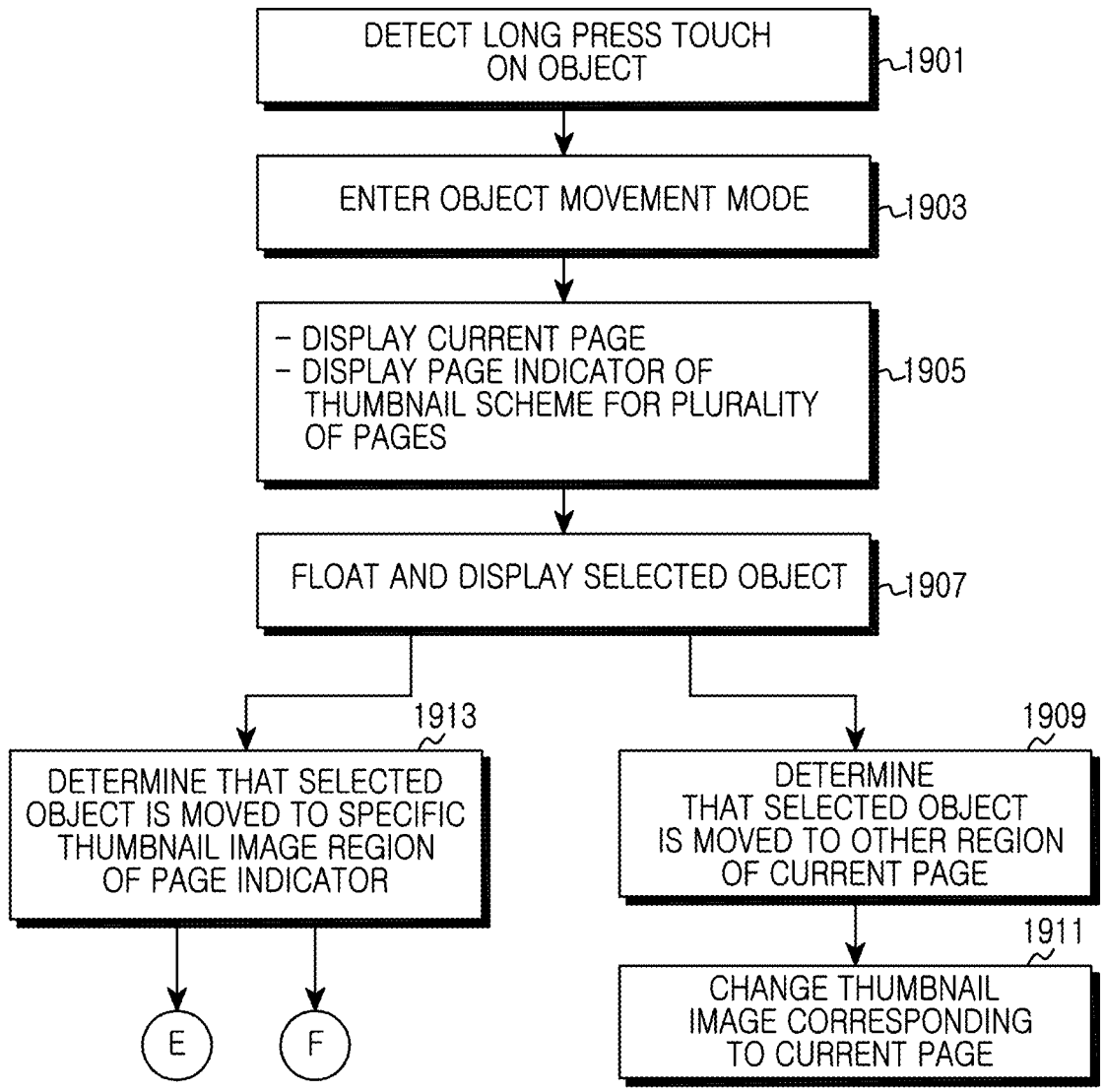
FIG. 19 to FIG. 22 are flowcharts illustrating methods for moving an object in a state of a long press touch on the object without a separate editing screen according to an embodiment of the present invention.

FIG. 19 is a flowchart illustrating a method of moving an object according to an embodiment of the present invention.

Referring to FIG. 19, the electronic device 100 proceeds to step 1901 and detects a long press touch on a specific object, among a plurality of objects displayed on the display unit. Next, the electronic device 100 proceeds to step 1903 and enters an object movement mode. Since the object movement mode is the same as the page editing mode illustrated in FIG. 12A and FIG. 12B, a description thereof is omitted. That is, if entering the object movement mode, the electronic device 100 proceeds to step 1905 and displays a current page and displays a page indicator of a thumbnail scheme for the plurality of pages. Next, the electronic device 100 proceeds to step 1907 and floats, highlights and displays the selected object.

After floating and displaying the object, the electronic device 100 determines if step 1909 or step 1913 is performed. In step 1909, the electronic device 100 determines whether the selected object is moved to another region of the current page. If the selected object is moved to another region of the current page in step 1909, the electronic device 100 proceeds to step 1911 and changes a thumbnail image corresponding to the current page into a thumbnail image to which the object is moved. In this state, if the touch on the object is released, the electronic device 100 may release the object movement mode and display a basic screen (i.e., a screen of FIG. 3) on the display unit.

Figure 20:
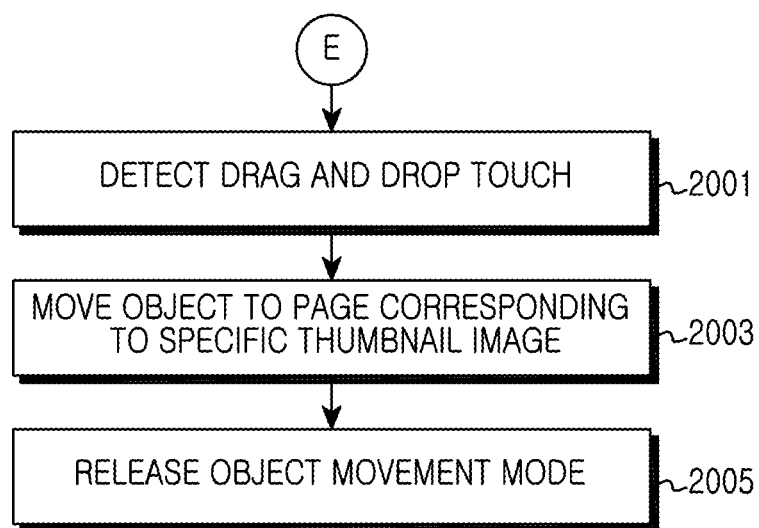
Figure 21:
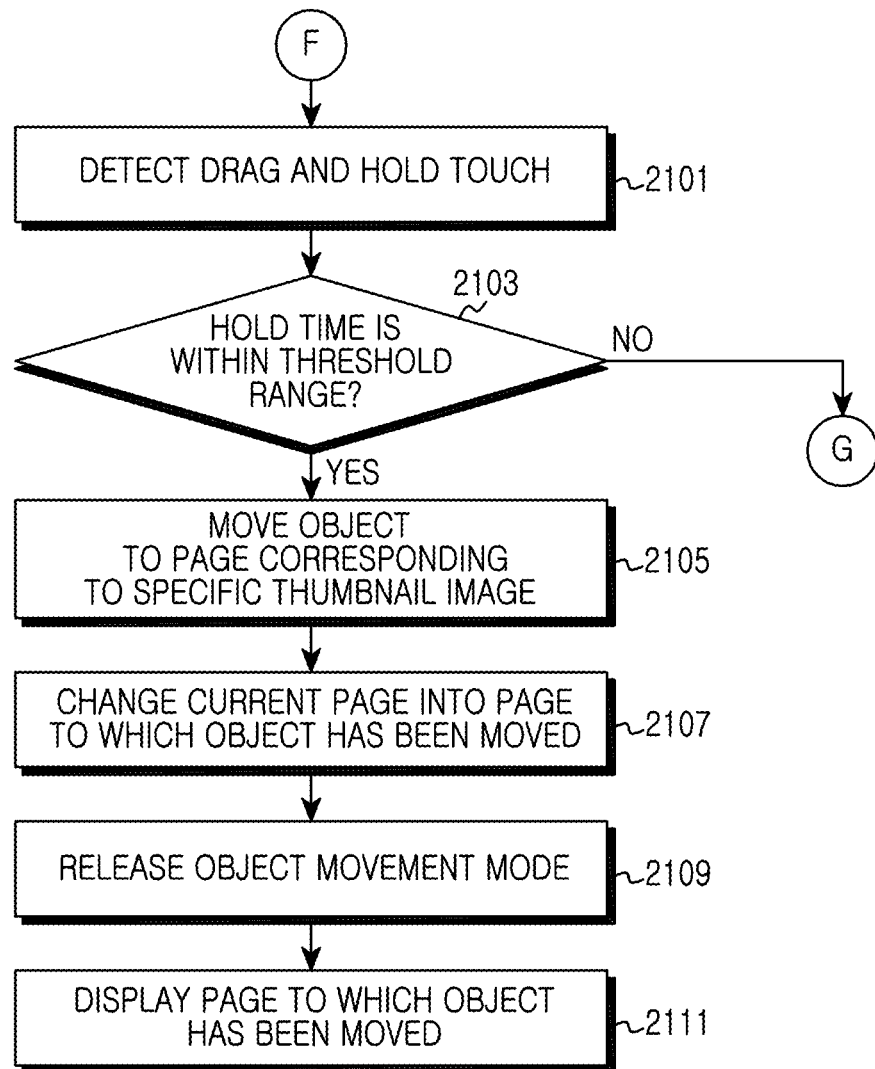

Alternatively, in step 1913, the electronic device 100 determines if the selected object is moved to overlap with a specific thumbnail image region of the page indicator and continuously performs step 'E' (FIG. 20) or step 'F' (FIG. 21).

FIG. 20 is a flowchart illustrating a method of moving an object according to an embodiment of the present invention.

Referring to FIG. 20, after step 1913 of FIG. 19, if it is determined, in step 2001, that a touch motion on an object moved to overlap with a specific thumbnail image region is a drag and drop touch, the electronic device proceeds to step 2003 and moves the object to a page corresponding to the specific thumbnail image. Next, in step 2005, the electronic device releases an object movement mode and displays a basic screen (i.e., a screen of FIG. 3) on the display unit.

FIG. 21 is a flowchart illustrating a method of moving an objet according to an embodiment of the present invention.

Referring to FIG. 21, after step 1913 of FIG. 19, if it is determined, in step 2101, that a touch motion on an object moved to overlap with a specific thumbnail image region is a drag and hold touch, the electronic device proceeds to step 2103 and determines if a hold time for holding the selected object in the specific thumbnail image region is within a preset threshold range. If it is determined in step 2103 that the hold time is greater than the preset threshold range, the electronic device performs step 'G' (FIG. 22).

Alternatively, if it is determined in step 2103 that the hold time is within the preset threshold range, the electronic device proceeds to step of 2105 and moves the object to a page corresponding to the specific thumbnail image. Here, the hold time within the preset threshold range represents a state of confirming that a touch and hold time is longer than a drag and drop and a touch is released within the threshold range.

Next, the electronic device proceeds to step 2107 and changes a page currently displayed on the display unit to the page to which the object has been moved and displays the changed page. Subsequently, in step 2109, the electronic device releases an object movement mode. At this time, a basic screen displays the page to which the object has been moved, and not the page in which the object was first located.

Figure 22:
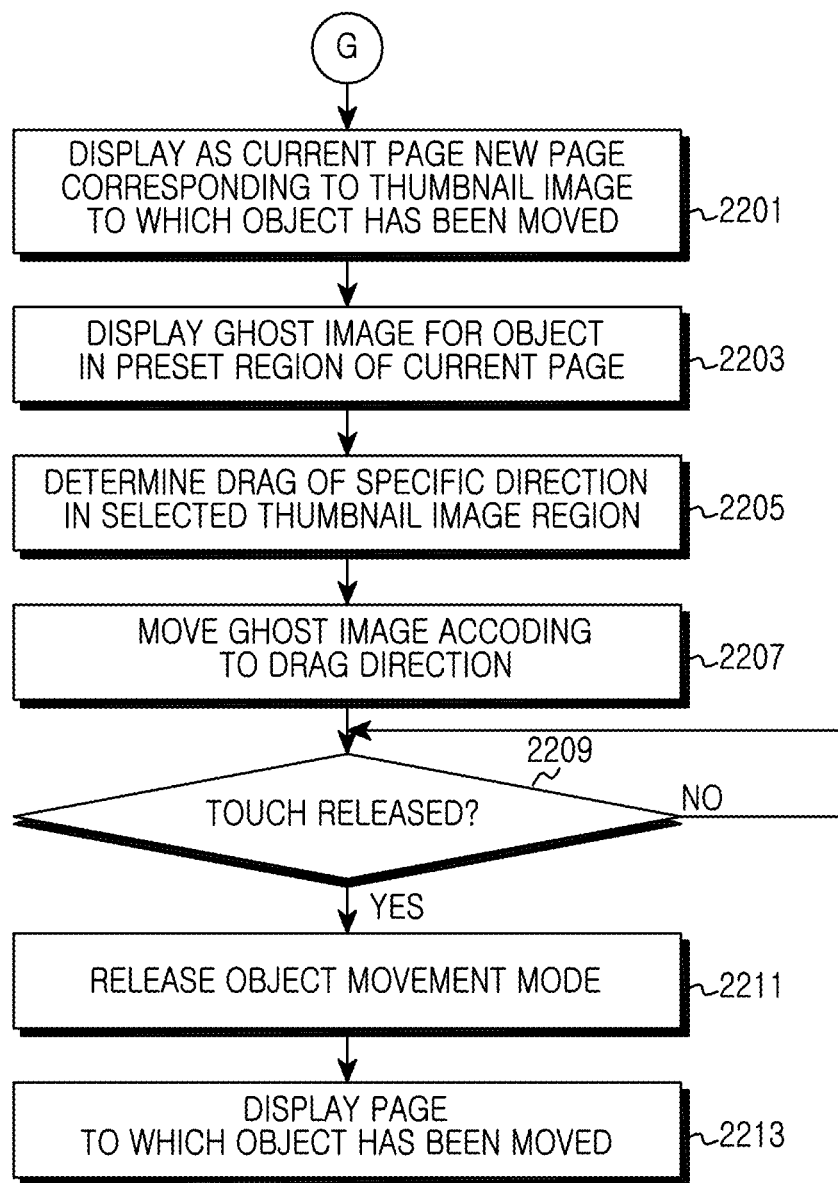

FIG. 22 is a flowchart illustrating a method of moving an object according to an embodiment of the present invention.

Referring to FIG. 22, after a user drags and holds an object in a corresponding thumbnail image region, if a continuous touch is held for a hold time exceeding a threshold range, in step 2201, the electronic device changes a current page into a new page corresponding to a thumbnail image to which the object has been moved and displays the new page on the display unit. Next, in step 2203, the electronic device displays a ghost image of the object intended to be moved, in a preset region of the new page. Here, the preset region represents a vacant region where no object exists in the new page. Also, the preset region can be, for example, a vacant region which gives priority to the left and uppermost regions Also, the ghost image, which is a virtual image of an object intended to be moved, may include known dotted-line or blurred image techniques and the like.

Subsequently, if a drag of a specific direction in the selected thumbnail image region is determined in step 2205, the electronic device proceeds to step 2207 and moves the ghost image according to the drag direction in the current page. Next, if it is determined that the touch is released in step 2209, the electronic device releases an object movement mode in step 2211 and displays a basic screen on the display unit. At this time, the basic screen displays, in step 2213, the new page to which the object is currently moved, not the page in which the object was first located.

Figure 23:
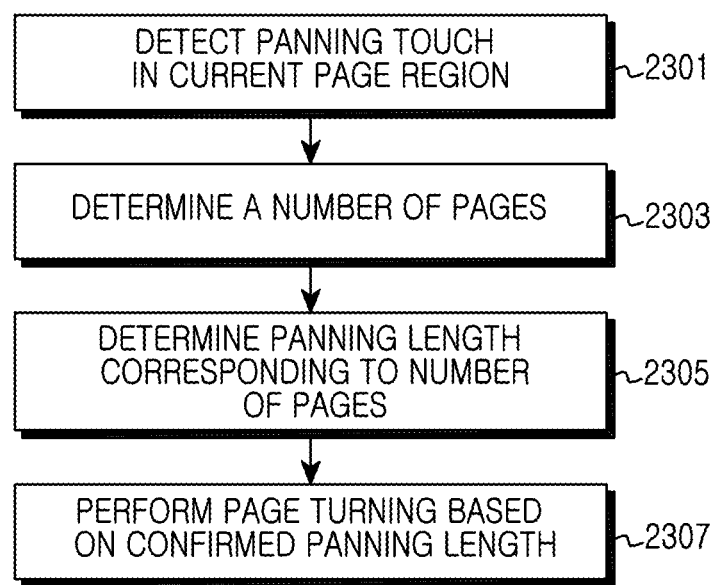
FIG. 23 is a flowchart illustrating a fast page navigation method according to an embodiment of the present invention.
Figure 24:
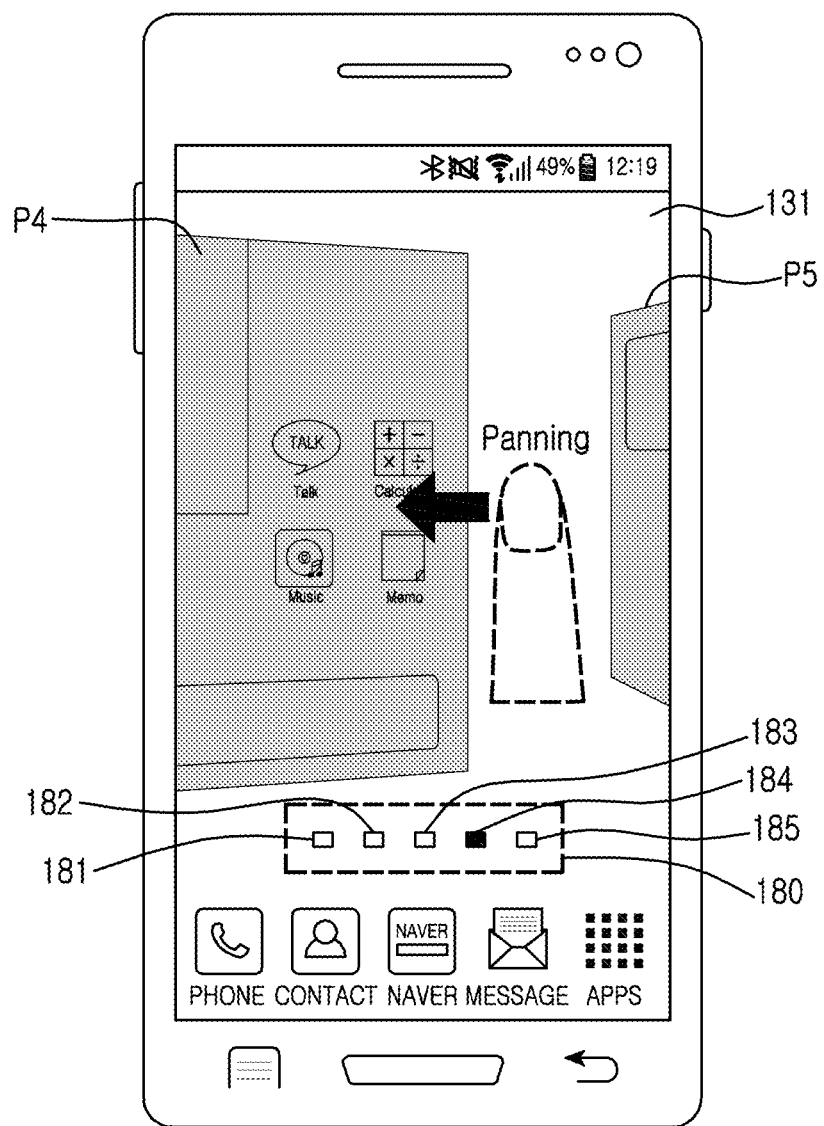
FIG. 24 is a diagram illustrating the method of FIG. 23.
Figure 25A:
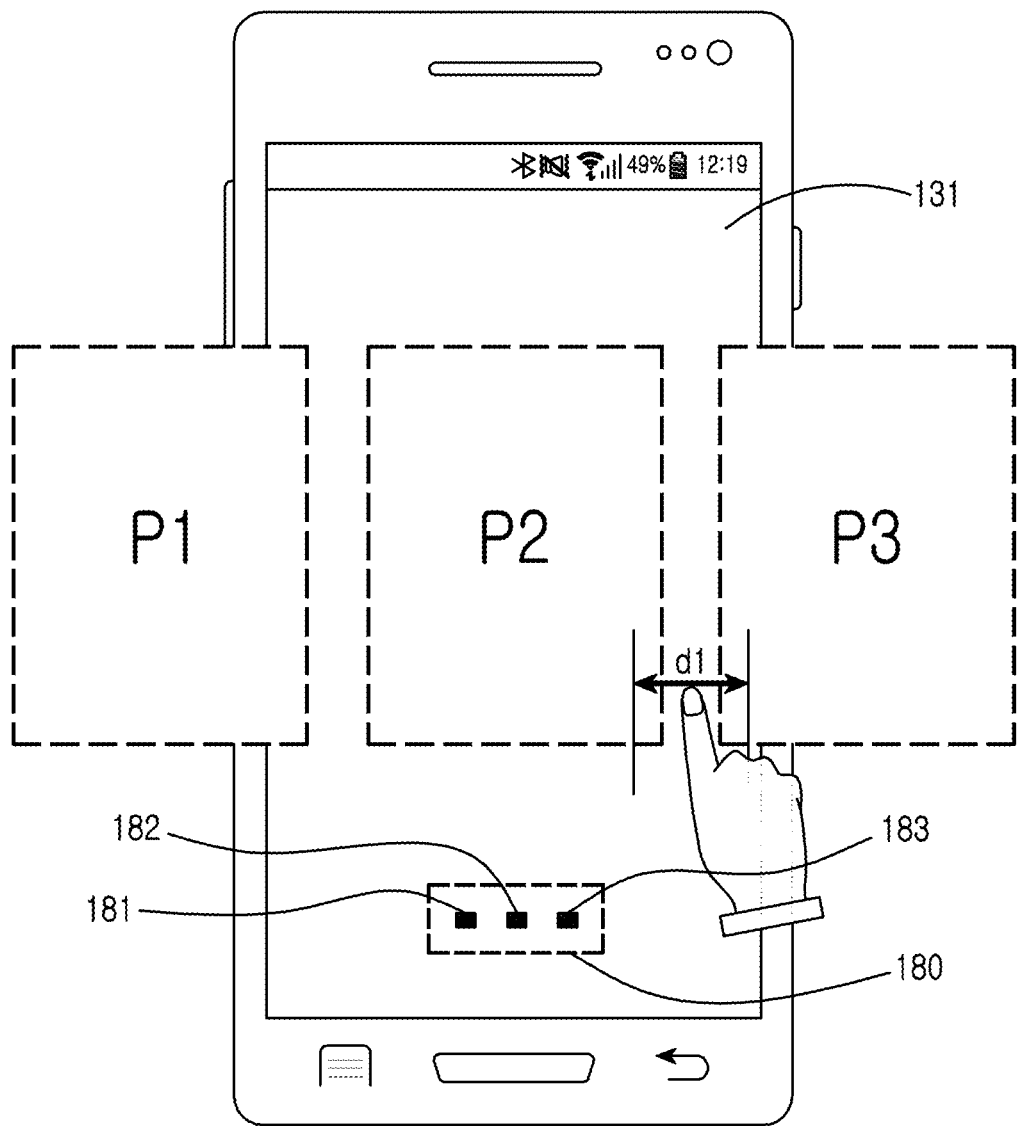
FIG. 25A and FIG. 25B are diagrams illustrating a panning distance for page navigation according to the method of FIG. 23.
Figure 25B:
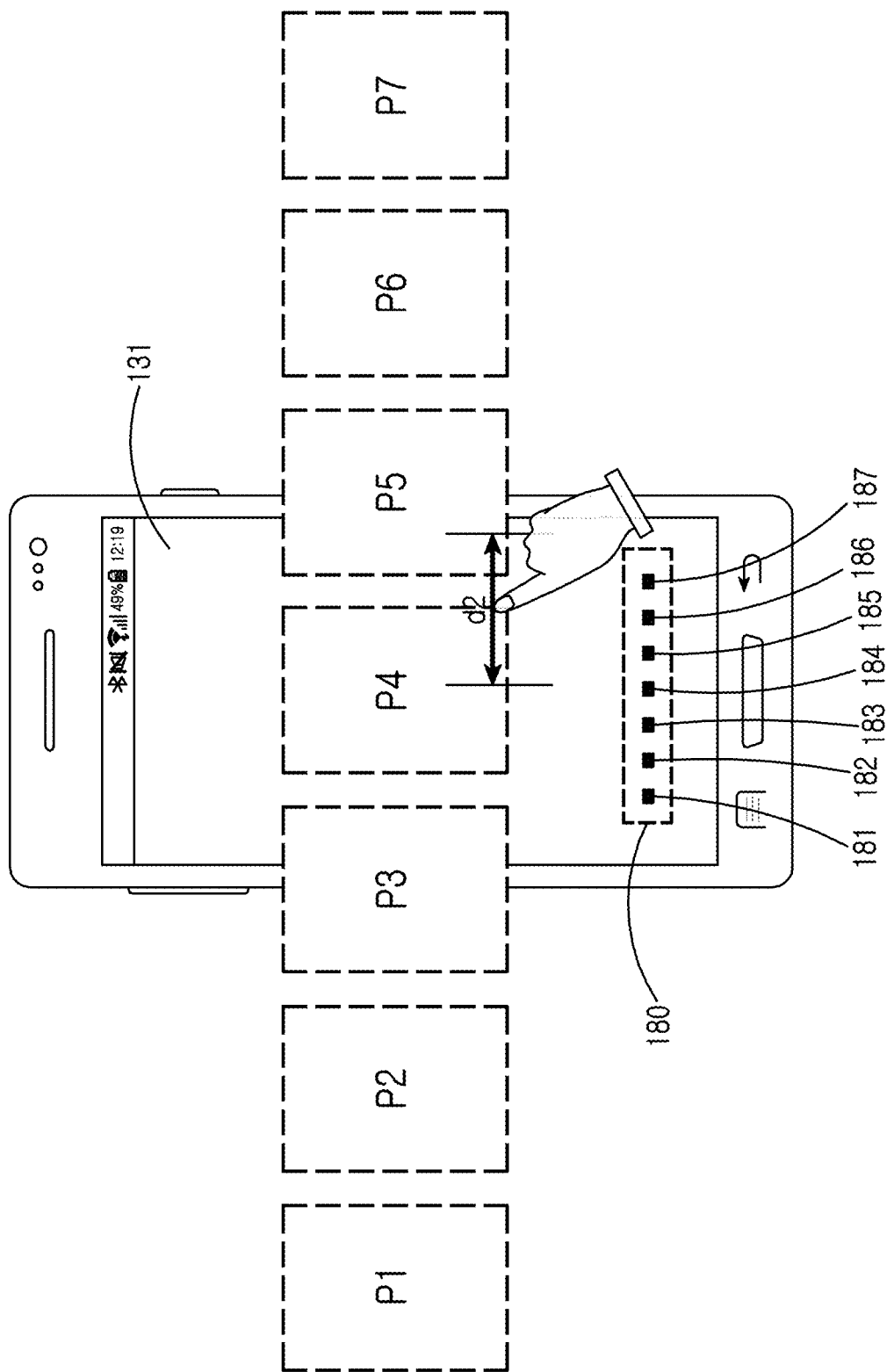

FIG. 23 is a flowchart illustrating a fast page navigation method according to an embodiment of the present invention. FIG. 24 is a diagram illustrating the method of FIG. 23. FIG. 25A and FIG. 25B are diagrams illustrating examples of a panning distance for page navigation according to the method of FIG. 23.

This embodiment proposes a method for fast page navigation in a current basic screen (i.e., a screen of FIG. 3) without entering a separate page editing mode or object movement mode.

In the conventional art, a swipe touch is performed five times in one direction to turn a total of five pages, and has a construction of turning only one page by one swipe motion. This construction not only results in a troublesome operation in browsing a plurality of pages but also takes a long time to browse the pages.

Accordingly, this embodiment provides an effect capable of conveniently browsing or moving the entire page by performing only a panning touch motion of a predetermined distance in a touch region. Although not illustrated, if a swipe touch is detected instead of a panning touch, the electronic device may perform a motion of sequentially turning one page at a time.

Referring to FIG. 23, in step 2301, the electronic device detects a panning touch in a current page region. Next, in step 2303, the electronic device determines a number of pages that exist in the electronic device. Subsequently, in step 2305, the electronic device determines a panning length corresponding to the number of pages and then, in step 2307, performs page turning based on the confirmed panning length.

Referring to FIG. 24, a user may perform a panning motion after getting a touch on the display unit 131. The electronic device 100 can detect the panning touch and perform page turning according to a panning direction. This diagram illustrates the moment the user turns the fourth page (P4) to the fifth page (P5). In this case, the electronic device 100 has many more pages in the display unit 131. In an indicator 180, a marker 184 corresponding to the displayed page (P4) can be highlighted and displayed compared to the other markers 181, 182, 183, and 185.

Referring to FIG. 25A, when the number of pages is three pages (P1, P2, and P3), a panning length (d1) can be set to a relatively short length. For example, the panning length (d1) can be set to a length of, for example, approximately ¼ of the entire length of the width direction of the display unit 131 of the electronic device 100. That is, the user can easily browse the entire three pages (P1, P2, and P3) by performing only a panning motion of the panning length (d1) in a region of the display unit 131.

Referring to FIG. 25B, when the number of pages is, for example, seven pages (P1, P2, P3, P4, P5, P6, and P7), a panning length (d2) can be set to a relatively long length. However, it is not desirable that the panning length (d2) is set to a length unreasonable for a user's panning touch no matter how long it is. Accordingly, in FIG. 25B, the panning length (d2) can be set to a length of, for example, approximately ½ of the entire length of the width direction of the display unit 131 of the electronic device 100. That is, the electronic device 100 can easily browse the entire seven pages by performing only a panning motion of the panning length (d2) in a region of the display unit 131.

However, this embodiment is not intended to limit the scope and spirit of the present invention, and the panning length may be set as an constant length irrespective of the determined number of pages. This set panning length may be set as a length making it most easy for a user to perform the panning touch in the display unit.

Further, the panning length can be set by the user irrespective of the number of pages.

It will be appreciated that embodiments of the present invention according to the claims and description in the specification can be realized in the form of hardware, software or a combination of hardware and software. Any such software may be stored in a non-transient computer readable storage medium. The non-transient computer readable storage medium stores one or more programs (software modules), the one or more programs including instructions, which when executed by one or more processors in an electronic device, cause the electronic device to perform a method of the present invention. Any such software may be stored in the form of volatile or non-volatile storage such as, for example, a storage device like a Read Only Memory (ROM), whether erasable or rewritable or not, or in the form of memory such as, for example, Read Access Memory (RAM), memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs including instructions that, when executed, implement embodiments of the present invention. Accordingly, embodiments provide a program including code for implementing an apparatus or a method as claimed in any one of the appended claims and a machine-readable storage storing such a program. Still further, such programs may be conveyed electronically via any medium such as a communication signal carried over a wired or wireless connection and embodiments suitably encompass the same.

While the invention has been shown and described with reference to certain embodiments thereof, it will be understood by those skilled in the art that various changes in form and details may be made therein without departing from the spirit and scope of the invention as defined by the appended claims.

What is claimed is:

1. An electronic device comprising:
a memory storing instructions;
a display; and
one or more processors, operably coupled to the memory and the display, configured to execute the stored instructions to:
display, in a first page among a plurality of pages including a second page, at least one object in an executable state and display, outside of the first page, a first indicator indicating the first page and a second indicator indicating the second page;
in response to detecting a touch input on the at least one object in the executable state:
display, in the first page with a reduced size, the at least one object in a floating state changed from the executable state; and
display, outside of the first page with the reduced size, a first thumbnail image changed from the first indicator and a second thumbnail image changed from the second indicator, wherein the first thumbnail image represents the first page and the second thumbnail image represents the second page;
in response to detecting a drag input for moving the at least one object in the floating state from a first area of the first page with the reduced size to a second area of the first page with the reduced size:
display, in the second area of the first page with the reduced size, the at least one object in the floating state; and
display, outside of the first page with the reduced size, the first thumbnail image representing the first page with the reduced size changed by moving the at least one object to the second area; and
in response to detecting another drag input for moving the at least one object in the floating state to the second thumbnail image:
display, in the second page with a reduced size changed from the first page with the reduced size, the at least one object in the floating state; and
display, outside of the second page with the reduced size, the first thumbnail image representing the first page with the reduced size changed by moving the at least one object to the second page with the reduced size and the second thumbnail image representing the second page with the reduced size changed by moving the at least one object to the second page with the reduced size.

2. The electronic device of claim 1, wherein:
the at least one object comprises one or more of an icon or a widget;
the first thumbnail image represents one or more of a location, a size or a shape of the at least one object displayed in the first page with the reduced size; and
the second thumbnail image represents one or more of a location, a size, or a shape of the at least one object displayed in the second page with the reduced size.

3. The electronic device of claim 1, wherein the one or more processors are further configured to execute the stored instructions to:
in response to detecting the touch input, display the first page in a translucent state changed from a transparent state.

4. The electronic device of claim 1, wherein the one or more processors are further configured to execute the stored instructions to:
display, outside of the first page with the reduced size, at least one system object, wherein the first thumbnail image and the second thumbnail image are displayed between the first page with the reduced size and the at least one system object; and
display, outside of the second page with the reduced size, the at least one system object,
wherein the first thumbnail image and the second thumbnail image are displayed between the second page with the reduced size and the at least one system object.

5. The electronic device of claim 1, wherein the one or more processors are configured to execute the stored instructions to:
if the at least one object being moved by the another drag input is superimposed on the second thumbnail image over a designated time, display the second page with the reduced size changed from the first page with the reduced size.

6. The electronic device of claim 1, wherein the at least one object accompanies at least one shadow object while the at least one object moves according to the drag input or the another drag input.

7. The electronic device of claim 1, wherein the one or more processors are further configured to execute the stored instructions to:
   detect, while the displaying the first page with the reduced size, a panning touch input on the first page with the reduced size; and
   display, in response to the detecting the panning touch input, the second page with the reduced size changed from the first page with the reduced size.

8. The electronic device of claim 1, wherein the one or more processors are further configured to execute the stored instructions to:
   detect, while the displaying the first page with the reduced size, a touch input on the second thumbnail image; and
   display, in response to detecting the touch input on the second thumbnail image, the second page with the reduced size changed from the first page with the reduced size.

9. The electronic device of claim 1, wherein the electronic device enters an edit mode, in response to the detecting the touch input on the at least one object, and
   wherein the at least one object in the floating state is, in response to detecting an input for releasing the edit mode, restored to the executable state.

10. A computer program product comprising a non-transitory computer readable storage medium having a computer readable program stored therein, wherein the computer readable program, when executed on at least one processor, configures, the at least one processor to:
   display, in a first page among a plurality of pages including a second page, at least one object in an executable state and display, outside of the first page, a first indicator indicating the first page and a second indicator indicating the second page;
   in response to detecting a touch input on the at least one object in the executable state:
      display, in the first page with a reduced size, the at least one object in a floating state changed from the executable state; and
      display, outside of the first page with the reduced size, a first thumbnail image changed from the first indicator and a second thumbnail image changed from the second indicator, wherein the first thumbnail image represents the first page and the second thumbnail image represents the second page;
   in response to detecting a drag input for moving the at least one object in the floating state from a first area of the first page with the reduced size to a second area of the first page with the reduced size:
      display, in the second area of the first page with the reduced size, the at least one object in the floating state; and
      display, outside of the first page with the reduced size, the first thumbnail image representing the first page with the reduced size changed by moving the at least one object to the second area; and
   in response to detecting another drag input for moving the at least one object in the floating state to the second thumbnail image:
      display, in the second page with a reduced size changed from the first page with the reduced size, the at least one object in the floating state; and
      display, outside of the second page with the reduced size, the first thumbnail image representing the first page with the reduced size changed by moving the at least one object to the second page with the reduced size and the second thumbnail image representing the second page with the reduced size changed by moving the at least one object to the second page with the reduced size.

* * * * *